Dec. 30, 1947.    H. G. KELLER ET AL    2,433,564
MACHINE FOR PRODUCING TOOTHED DISCS
Filed May 20, 1943    16 Sheets-Sheet 1

Fig. 1.

Inventors
Henry G. Keller and
Charles M. Young, Jr.
By L. Donald Myers
Attorney

Inventors
Henry G. Keller and
Charles M. Young, Jr.
By L. Donald Myers
Attorney

Dec. 30, 1947. H. G. KELLER ET AL 2,433,564
MACHINE FOR PRODUCING TOOTHED DISCS
Filed May 20, 1943 16 Sheets-Sheet 8

Inventors
Henry G. Keller and
Charles M. Young, Jr.
By F. Donald Myers
Attorney

Dec. 30, 1947.　　　H. G. KELLER ET AL　　　2,433,564
MACHINE FOR PRODUCING TOOTHED DISCS
Filed May 20, 1943　　　16 Sheets-Sheet 9

Inventors
Henry G. Keller and
Charles M. Young, Jr.
By L. Donald Myers
Attorney

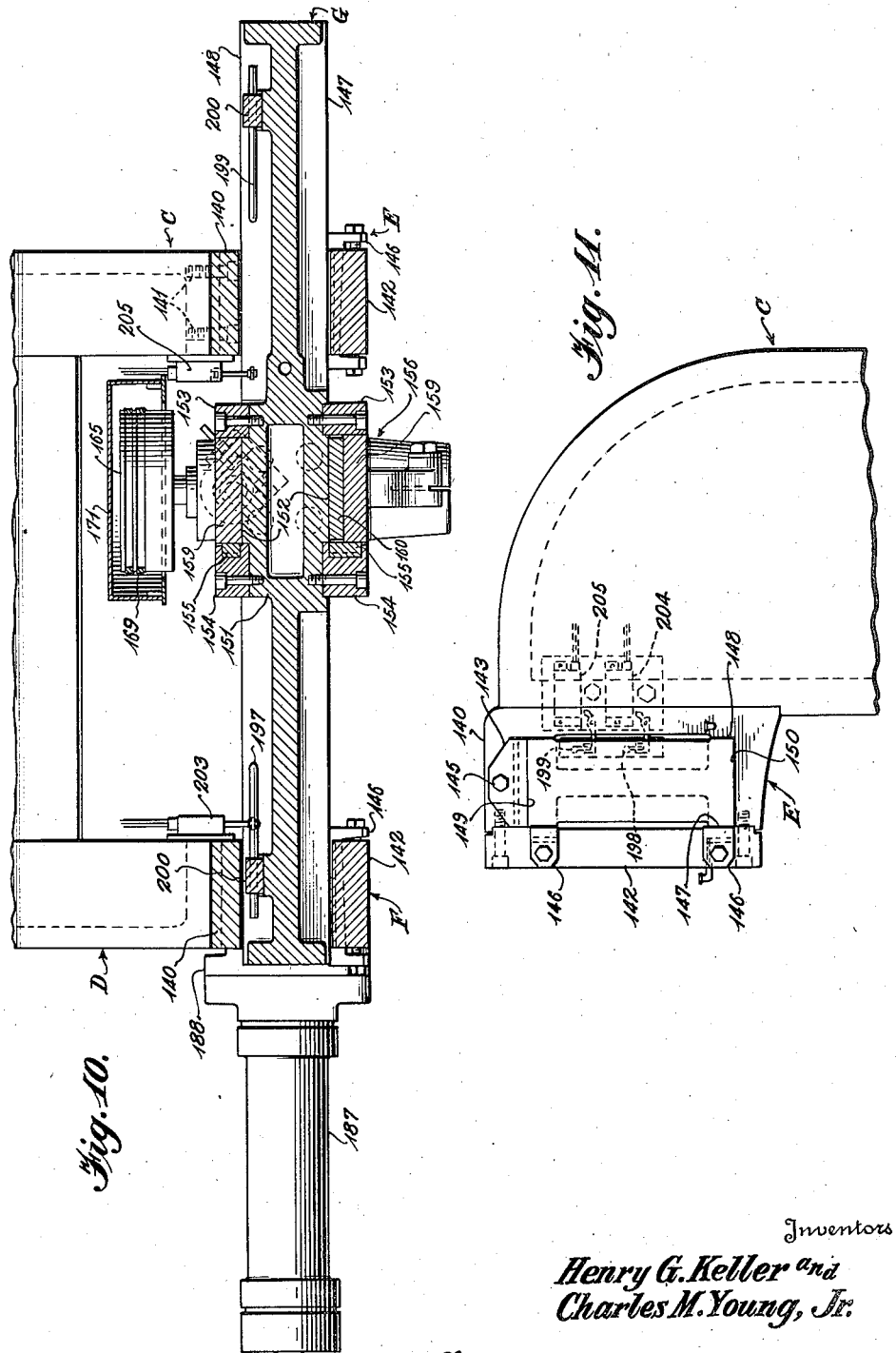

Dec. 30, 1947.  H. G. KELLER ET AL  2,433,564
MACHINE FOR PRODUCING TOOTHED DISCS
Filed May 20, 1943  16 Sheets-Sheet 11
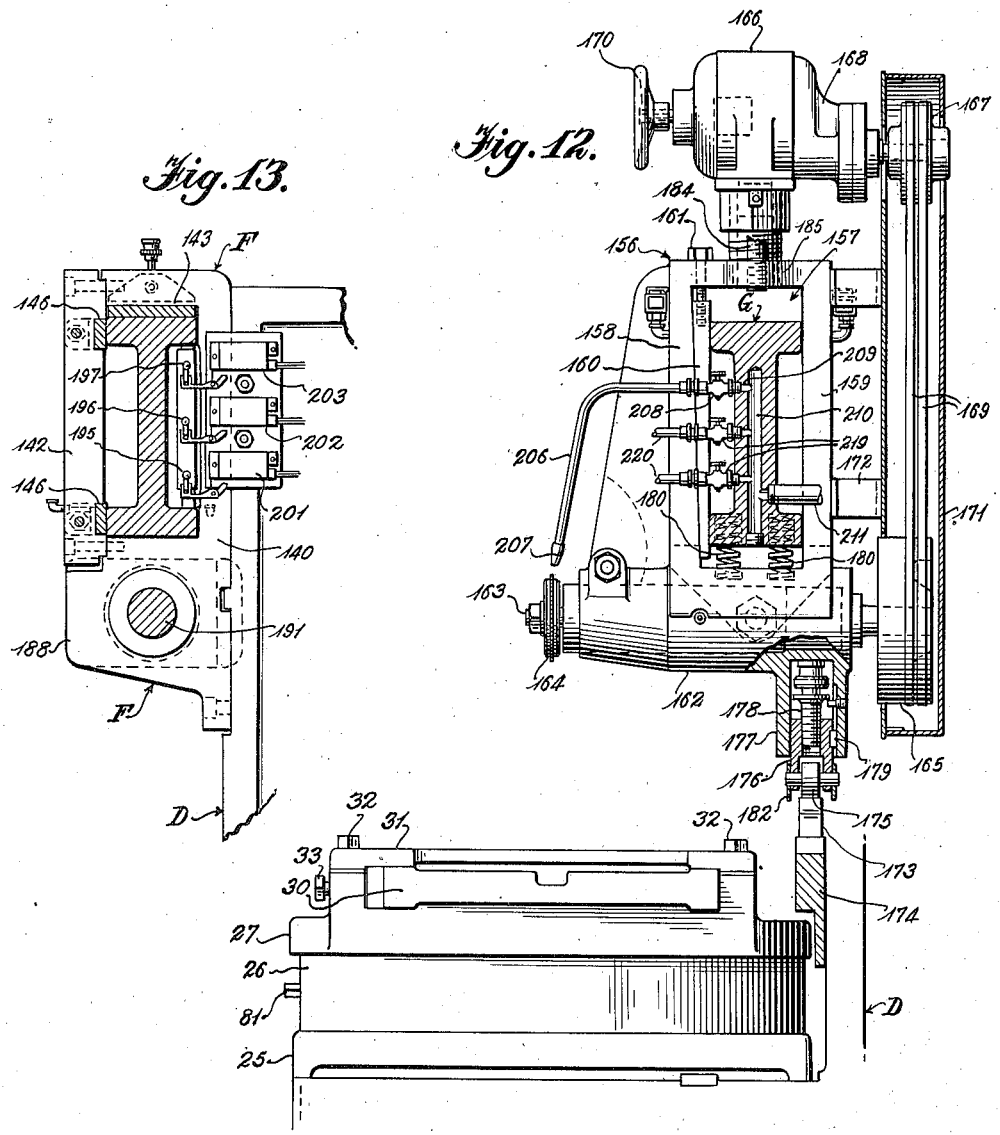
Inventors
*Henry G. Keller* and
*Charles M. Young, Jr.*
By L. Donald Myers
Attorney

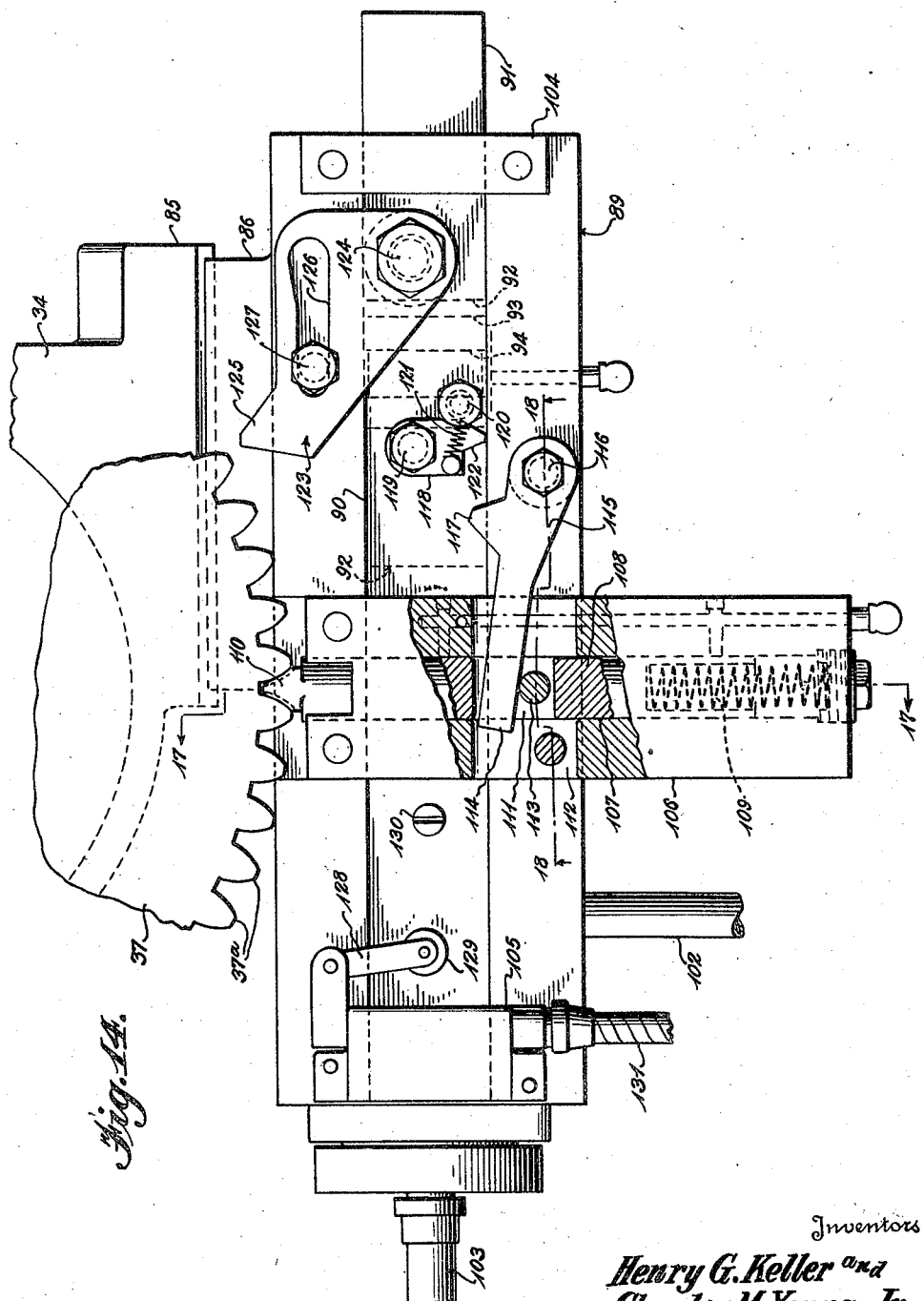

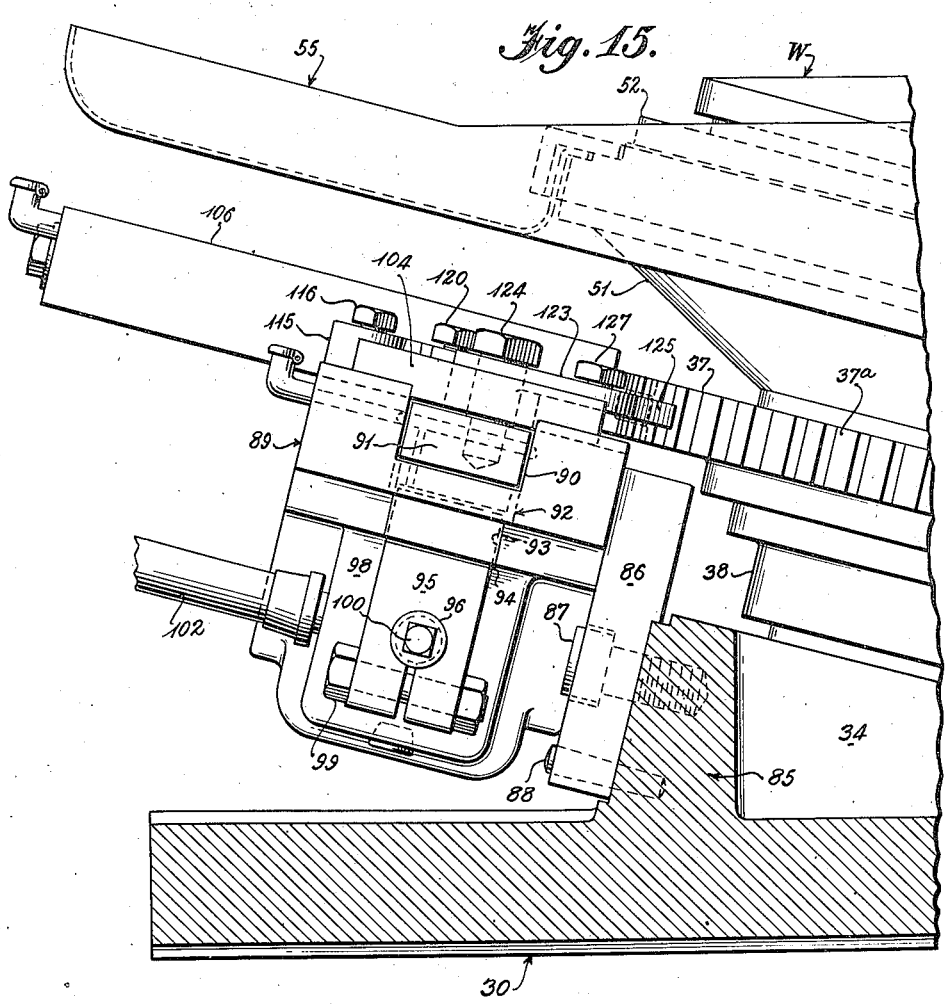
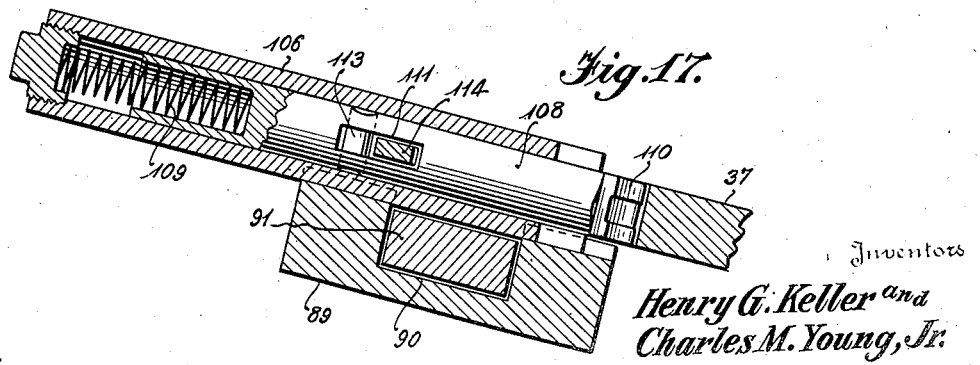

Dec. 30, 1947.   H. G. KELLER ET AL   2,433,564
MACHINE FOR PRODUCING TOOTHED DISCS
Filed May 20, 1943   16 Sheets-Sheet 14
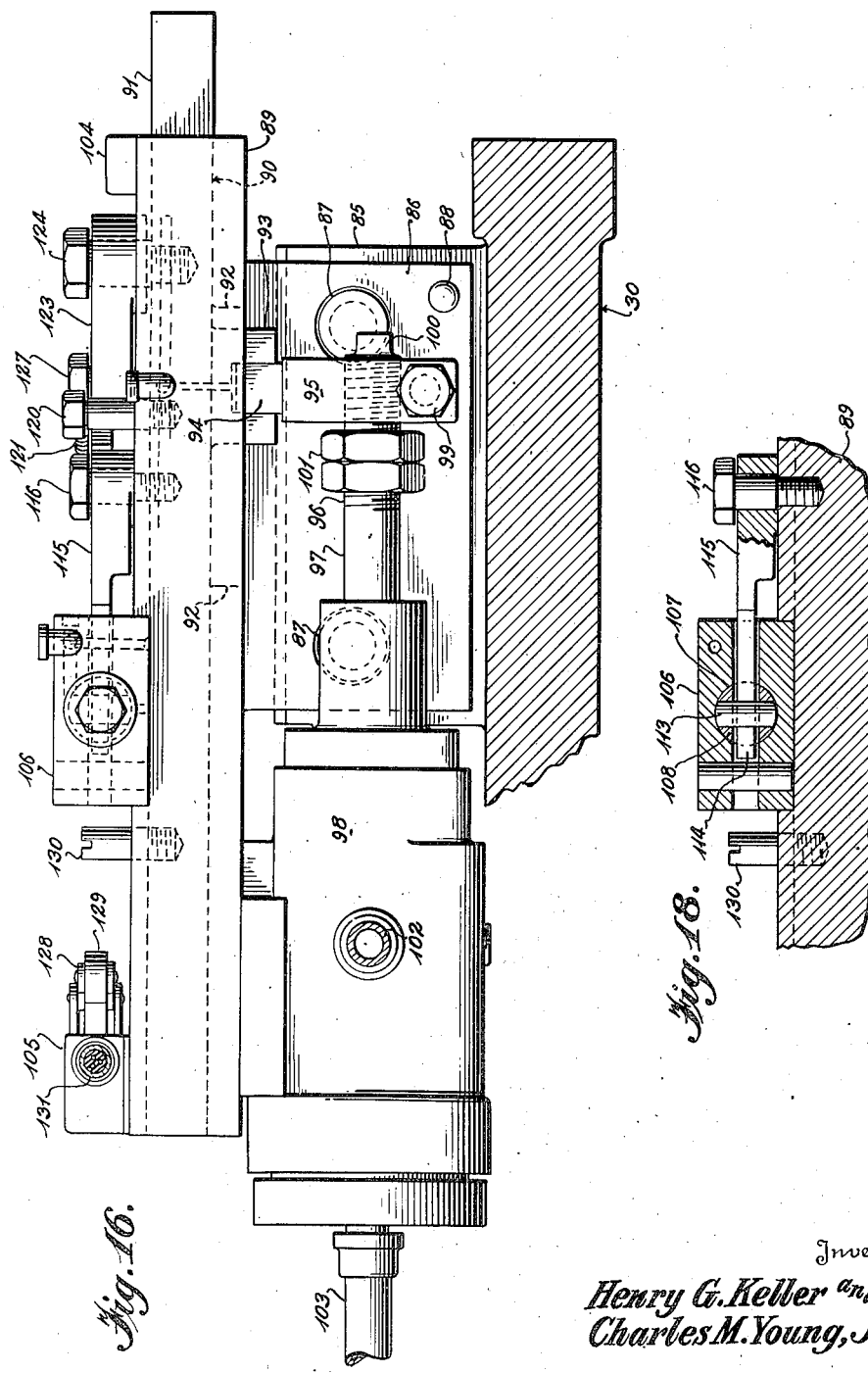
Inventors
Henry G. Keller and
Charles M. Young, Jr.
By L. Donald Myers  Attorney Dec. 30, 1947.   H. G. KELLER ET AL   2,433,564
MACHINE FOR PRODUCING TOOTHED DISCS
Filed May 20, 1943   16 Sheets-Sheet 16

Inventors
Henry G. Keller and
Charles M. Young, Jr.
By L. Ronald Myers
Attorney

Patented Dec. 30, 1947

2,433,564

UNITED STATES PATENT OFFICE 2,433,564

MACHINE FOR PRODUCING TOOTHED DISCS

Henry G. Keller, Glenside, and Charles M. Young, Jr., Philadelphia, Pa., assignors to Link-Belt Company, a corporation of Illinois Application May 20, 1943, Serial No. 487,782

26 Claims. (Cl. 90—15.1)

This invention relates to new and useful improvements in machines for producing toothed discs.

It is the primary object of this invention to provide a machine that is particularly adapted to produce the toothed faces on conical pulley wheel discs used in infinitely variable speed transmissions of the positive type, known commercially as P. I. V. gear.

Each one of these P. I. V. gear units requires four of these conical discs. The discs are arranged in two pairs by being slidably splined or keyed on parallel driver and driven shafts. The toothed conical faces of each pair of discs are arranged so as to collectively form a V-pulley wheel assembly. A chain, having slat packs carried by its links, is trained over the pulley wheels to provide a power transmission connection between the shafts. The discs of each pair are adjustable toward and from each other to vary the effective diameters of the pulley wheels. The ratio of the drive between the two shafts is changed by inversely varying the effective diameters of the two pulley wheels.

The conical faces of the discs are formed with radial teeth and the teeth of opposed discs are staggered; i. e., the teeth of each disc are arranged opposite the spaces or grooves of the other disc, so that the slats of each chain link pack, by partaking of proper transverse sliding movements, may have their end portions arranged to conform to and positively mesh with the teeth of both discs over the full range of effective diameters of a pulley wheel.

At the present time pulley wheel discs are being produced in several different sizes. The diameters of the disc faces for these sizes range from 4¼ inches up to 15⅞ inches. The radial dimensions of the teeth formed on these discs range from approximately 1 inch to approximately 6 inches. Discs measuring up to 18 inches in diameter, having teeth of correspondingly greater radial dimensions, are contemplated for the future. These teeth are tapered radially, or widened outwardly, and are formed with beveled side faces or flanks. According to the present preferred practice, the teeth are extremely shallow and of uniform depth throughout their lengths while the top faces of the individual teeth are comparatively wide. The center lines of the teeth as well as the intermediate spaces or grooves extend radially and intersect at the true axis of the disc. The remaining tooth lines, such as face, pitch, and root, however, do not radiate from said true axis.

It is a further important object of this invention to provide a single machine which, by employing mandrels, adapters, gage blocks, cutting tools, tool and and work moving control cams, and machine operation control elements of appropriate sizes and shapes, will be capable of producing the aforementioned full range of pulley wheel disc sizes.

Another important object of the invention is the provision of a machine of the aforementioned type which, after being conditioned for handling a given size disc, and upon being manually started after the blank of such a disc has been properly positioned therein, will proceed automatically through a production cycle which will bring about the formation of a complete set of teeth on the conical face of the disc blank.

Prior to the development of the present machine, discs for P. I. V. gears have been produced on but two fundamentally different types of machines. Representative disclosures of these machines are provided by the patent to G. J. Abbott, No. 1,775,184, issued September 9, 1930, and the patent to A. Maurer, No. 1,957,028, issued May 1, 1934. Both of these prior machines produce the tapered teeth on the conical disc faces by cutting away sufficient material at the locations of the tooth spaces to form the flanks of the teeth and the grooves between these flanks.

The Abbott machine employs a fixed up-milling cutter for producing the grooves. The work partakes of a compound motion relative to the fixed cutter at each groove location. This motion includes oscillation of the work transversely of the cutter to develop the width of the groove and radial travel or feed of the work relative to the cutter to provide the length of the groove. The groove is started with the cutter located at the outer end thereof and is completed when the cutter reaches the inner end of the groove. The work is rotated about its true axis for indexing to the locations of the successive grooves.

The Maurer machine employs a planer tool motion. The work is indexed to the successive locations of the tooth tops and tooth spaces or grooves which are to be cut to produce the teeth. During the cutting of each tooth, the work partakes of a complicated compound motion relative to the straight line path of travel of the tool which will cause the material to be cut away throughout the desired depth and progressively widening breadth of the groove while leaving beveled faces or flanks on the sides of the teeth. As the grooves are widened radially outwardly and are of approximately equal width at their narrower ends to the cutting edge of the tool, compound motion of the work must be such that the cut strokes of the tool properly traverse the width of the groove while the tool penetrates to the proper depth.

It is a further important object of this invention to provide a milling machine for producing toothed discs by removing the material at circumferentially spaced intervals to form the radially tapered grooves that occur between the teeth, with each disc being indexed about its true axis to locate the successive grooves and being oscillated at each groove location about an axis other than said true axis to position the disc for the individual cuts of the series that is required to produce each groove.

A still further important object of the invention is the provision of a machine which will produce the teeth in the conical faces of pulley wheel discs by milling radially tapered grooves in said faces, each of said grooves being formed by a predetermined number of strokes of a single milling tool relative to the work with each successive stroke of the series being in a reverse direction to that of the next preceding stroke and resulting in removing a straight line cut of material, with the result that there will be no idle or return strokes and a certain number of the cuts will be produced by up-milling while the remaining cuts will be produced by down-milling.

Another object of the invention is to provide a machine which will operate automatically to cut any desired number of equally spaced, duplicate, radially tapered grooves in the conical face of a disc with each groove being produced by a series of straight line, alternate up-milling and down-milling cuts of uniform depth which are reduced in length as the formation of the groove progresses.

Further, more specific objects of the invention are to provide a machine for producing P. I. V. gear discs with which the cutter feed and speed may be increased up to cutter limitations; with which a minimum amount of time is required to set up the machine for producing different sizes and types of discs; with which the radial contour of a disc face may be controlled by a simple cam which will have identical contour to that desired for the finished disc; with which a single, multiple lobe cam is employed for oscillating the disc blanks at each groove or space location to position the blanks for the successive cuts of the series that is required to produce each groove; and with which, by making simple adjustments, the number of teeth produced and the shape and dimensions of the teeth may be varied within wide limits.

Other objects and advantages of the invention will be apparent during the course of the following description.

In the accompanying drawings forming a part of this specification and in which like numerals are employed to designate like parts throughout the same, Figure 1 is a front elevational view of the toothed disc producing machine embodying this invention, Figure 2 is a top plan view of the said machine, Figure 3 is an elevational view taken from the right hand end of the machine, Figure 4 is an elevational view taken from the left hand end of the machine, Figure 5 is a rear elevational view of the machine, Figure 6 is a detail, enlarged elevational view of the left hand end of the machine and shows the turret supporting base portion of the machine with certain timing control mechanism and table oscillating mechanism assembled thereon, Figure 7 is a detail, enlarged plan view of the turret supporting base and the oscillating table with the mechanism employed for effecting oscillation of said table, Figure 8 is a detail, enlarged vertical sectional view that is taken through the turret supporting base and the work turret table, Figure 9 is a detail, rear elevational view of the tool beam and cutter spindle assembly, Figure 10 is a detail, horizontal sectional view taken on line 10—10 of Fig. 9.

Figure 11 is a detail, end elevational view of the tool beam and its guide,

Figure 12 is a detail, vertical sectional view taken on line 12—12 of Fig. 9,

Figure 13 is a detail, vertical sectional view taken on line 13—13 of Fig. 9,

Figure 19:
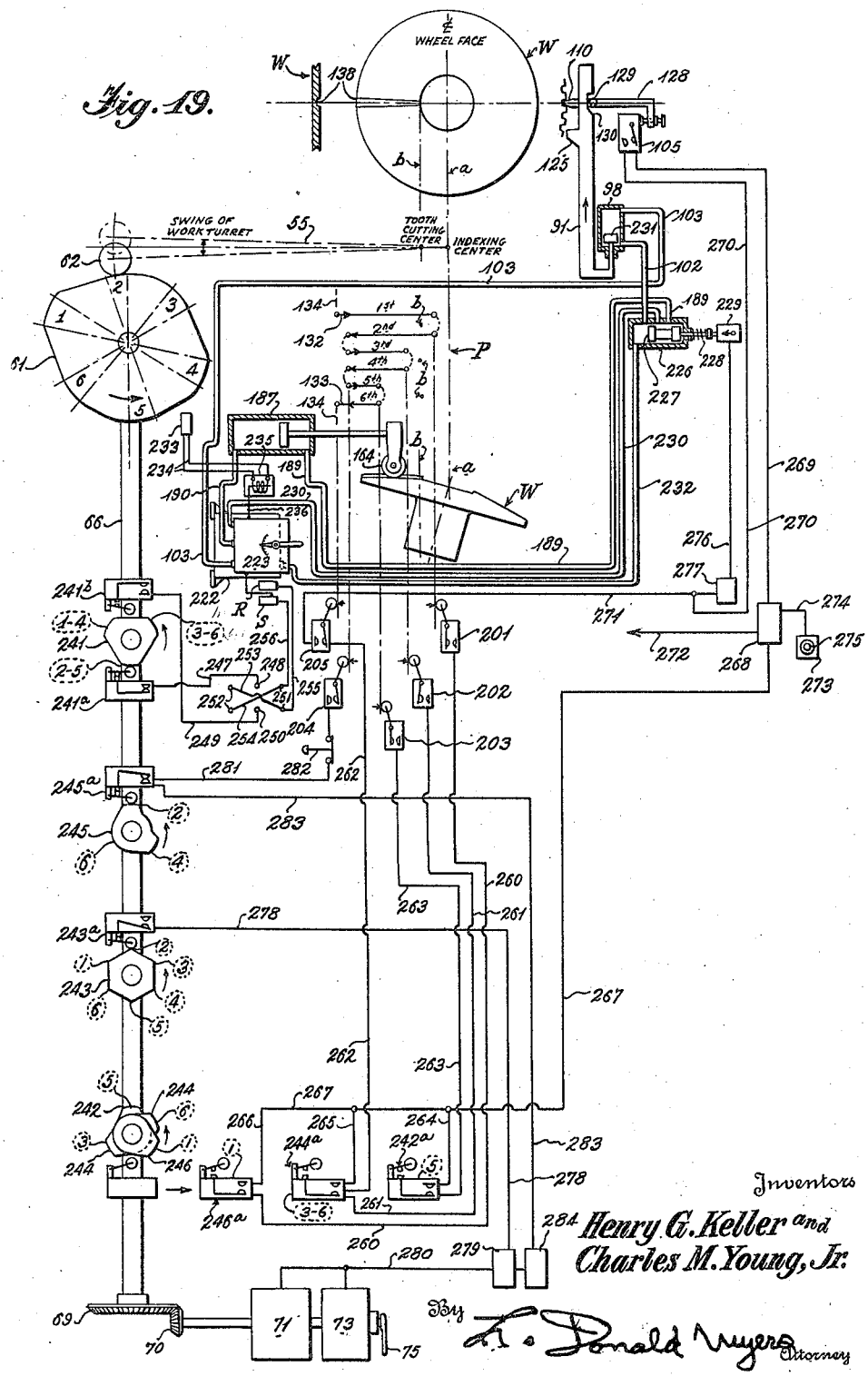
Figure 20:
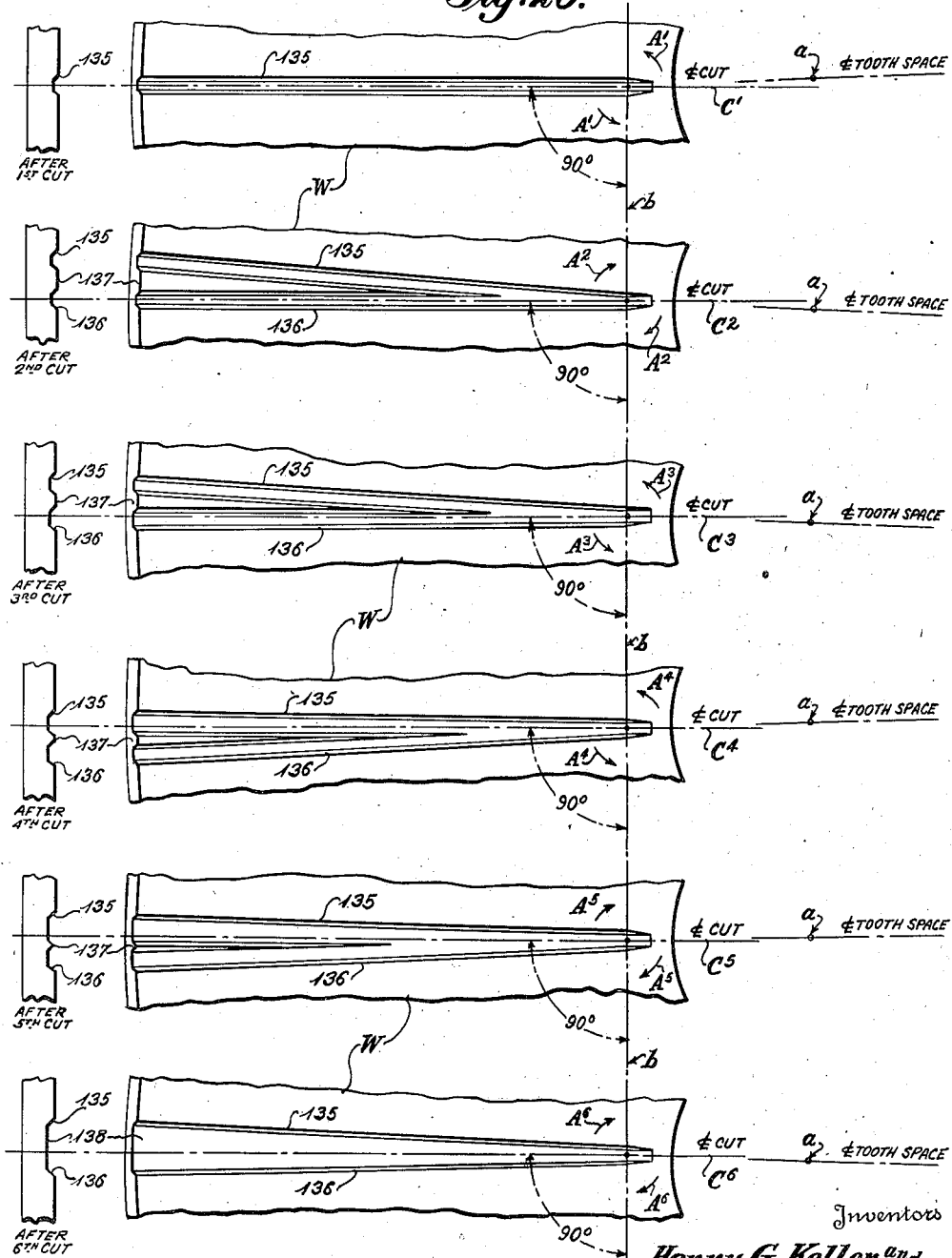

Figure 14 is a detail plan view of the mechanism employed for indexing the work holding chuck about the true axis of each disc blank for placing the space or groove locations, occurring between adjacent teeth, in operative relation to the cutting tool, Figure 15 is an elevational view of the indexing mechanism of Fig. 14 and taken at the right hand end of this latter figure, Figure 16 is an elevational view of the indexing mechanism and taken at right angles to the view of Fig. 15, Figure 17 is a detail sectional view taken on line 17—17 of Fig. 14, Figure 18 is a detail sectional view taken on line 18—18 of Fig. 14, Figure 19 is a schematic diagram of the hydraulic and electric control system which causes the machine to automatically proceed through a complete operation cycle for producing a complete set of teeth on a conical disc after the machine is manually started up, and Figure 20 is a schematic view which illustrates the several different cuts that are made in the face of a disc blank in producing one space or groove occurring between two adjacent teeth.

In the drawings, wherein for the purpose of illustration is shown the preferred embodiment of this invention, and first particularly referring to Figs. 1 to 5 inclusive, the reference character A designates in its entirety the welded steel turret supporting base of the machine frame. This base provides support and housing space for certain hydraulic and electric control devices. This machine base will not be described in detail to any considerable extent because such details are of no particular importance. Mounted on this supporting base is the work turret table which is designated in its entirety by the reference character B. The back or rear portion of the machine is made up of two welded steel upright posts which are designated in their entirety by the reference characters C and D. These posts are arranged in back of the turret supporting base and extend above the turret work table to provide mounts for the tool beam guides E and F which slidably support the horizontally movable tool beam G. This tool beam G supports the cutter head H for relative vertical movement. This completes a general description of the basic or fundamental units of the machine. The detail features of construction of these basic units now will be given.

The work turret table assembly is best illustrated in Figs. 1 to 4 inclusive and 6 to 8 inclusive. This assembly includes a stationary table portion 25 which is suitably mounted on and secured to the turret supporting base A. The right hand end portion of this stationary table part 25 is formed with an annular table bearing or mount 26. This bearing or mount functions to support the oscillating table part 27. A suitable detachable ring 28 is carried by the oscillatable table part 27 and bears against the inwardly directed top flange of the bearing or mount 26 to maintain this assembly. By means of this construction, the table part 27 is supported for oscillatory movement about a truly vertical axis.

Figure 7:
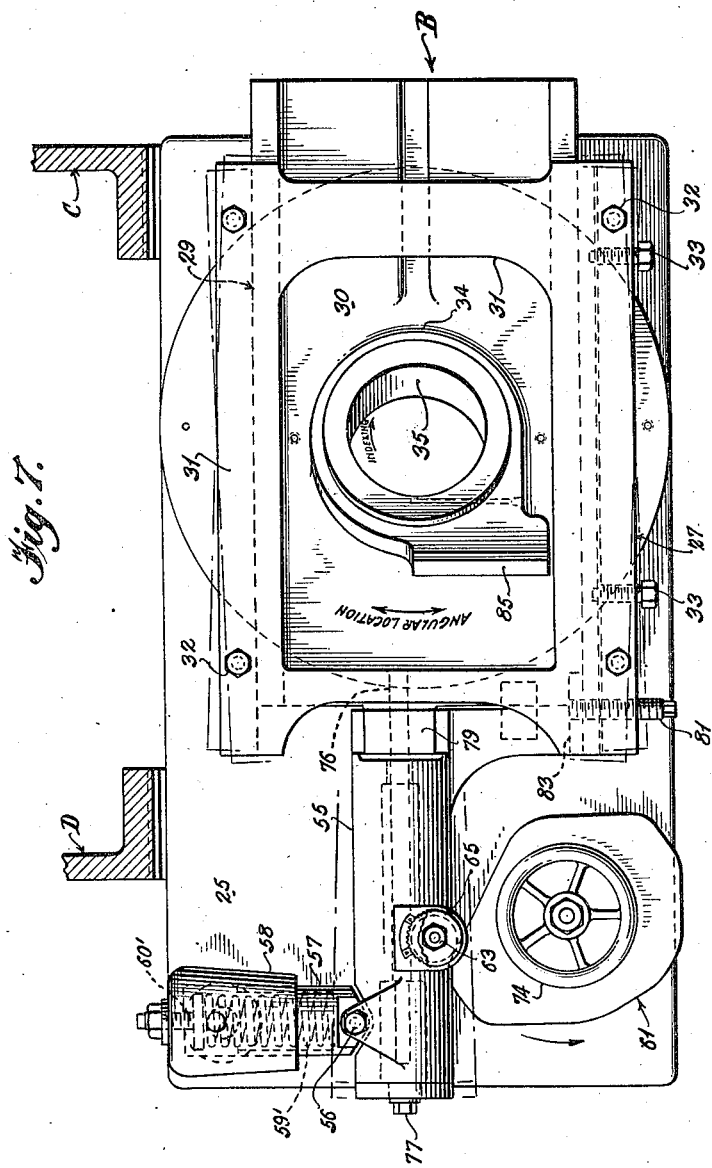

The oscillatable table part 27 is formed with a horizontally arranged guideway 29 which functions to adjustably support the compensating chuck carriage 30. A rectangular, centrally cut away, retainer plate 31 is secured to the oscillatable table part 27 by the screws 32 to hold the compensating chuck carriage 30 in the guideway 29. Fig. 7 discloses the guideway 29 as being of greater width than the compensating chuck carriage 30. Carriage adjusting screws 33 are provided to locate the carriage 30 within the table guideway.

Figure 8:
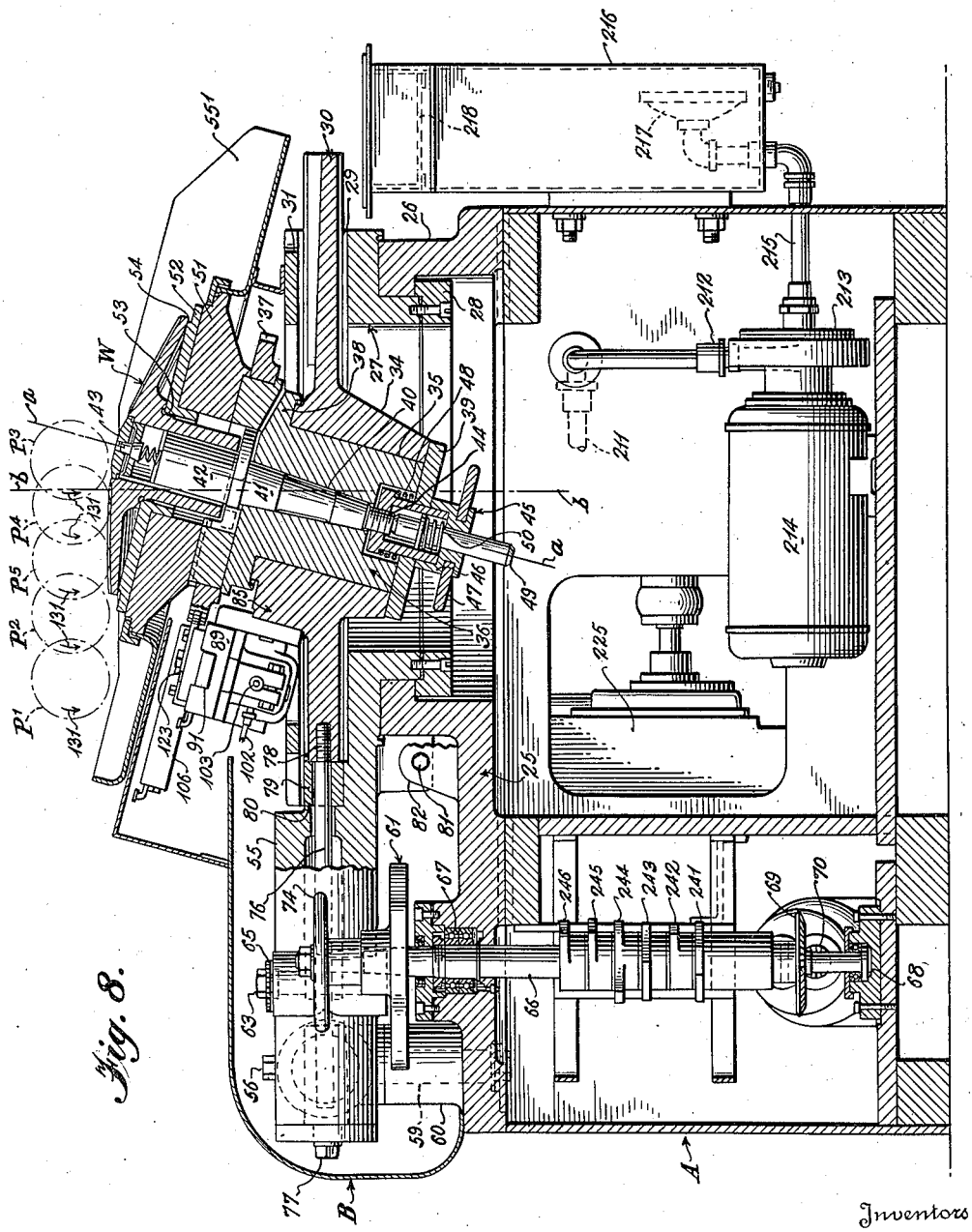

The compensating chuck carriage 30 is illustrated in Figs. 7 and 8 as having formed thereon a chuck receiving hub 34 which is formed with the bore or opening 35. This bore or opening is so formed that its axis is inclined, or forms an acute angle with respect to the axis of oscillation of the table part 27. The bore or opening 35 of the hub 34 acts as a bearing for the chuck 36 which is rotatably positioned therein. This chuck 36 supports the work for indexing movement about the axis of the hub bearing opening 35. The chuck 36 is provided with an indexing ring 37 at its upper end portion. This ring is formed with peripheral teeth through the medium of which the work holding chuck 36 is rotated by the indexing mechanism which will be described in detail at a later point.

The work holding chuck 36 is provided with an enlarged upper end portion 38 that rests upon the upper end surface of the compensating chuck table hub 34. The work holding chuck 36 is retained in the bearing opening 35 of the hub by the lower end plate 39 which is suitably attached to the lower end of the chuck.

The chuck is provided with a tapered bore or opening 40 for receiving the tapered shank 41 of work holding mandrels. It will be understood that each different sized disc blank will have its own work holding mandrel. The shanks 41 of all of these mandrels will be of the same size so as to properly fit the tapered bore 40 of the chuck 36. The mandrel heads 42, however, will vary in size to accommodate the different sized hub portions of the disc blanks. The disc blanks, which will be designated by the reference character W in the several views, will have their hub portions supported on the head 42 of their particular sized mandrel and will be secured in place by suitable retaining mechanism 43. The disc blanks W, therefore, will rotate with the head portion 42 of their mandrel when the work holding chuck 36 is indexed to arrange the successive groove locations of the disc blank in operative relation to the cutting tool. It will be seen, therefore, that the disc blanks W will be indexed about their true axis which is represented by the dash line a, see Fig. 8.

The extreme lower end portion 44 of the mandrel shank 41 is threaded for connection with the nut 45. This nut has a head 46 which bears against the end plate 39 of the work holding chuck 36 and which is further provided with an operating wheel 47. By rotating this nut 45, the work holding mandrels are drawn into place in the tapered bore 40 of the chuck 36. This draw-in nut is provided with a spring 48 that bears against the inner face of the end plate 39 and an inner end flange to normally position the head 46 of the nut in engagement with said end plate. By rotating this nut in a clockwise direction, when viewed from below, it will draw the mandrel shank in place and by rotating the nut in a counterclockwise direction, it will be fed off of the end of the mandrel shank and will compress the spring 48.

The nut carries or supports a knockout pin 49 which is held in engagement with the inner end of the mandrel shank 41 by the spring 50. In other words, after the nut 45 has been backed off of the threaded end of the mandrel shank, a blow delivered to the lower end of the pin 49 will loosen the tapered mandrel shank from the tapered bore 40 of the work holding chuck 36.

Outwardly of the upper end of the chuck 36 there is positioned an indexable support 51. This support acts as a rest for adapter plates 52. A different sized adapter plate is provided for each different sized disc. The adapter plates function to support the discs on annular surfaces 53, where the disc body and its hub are joined, and at the periphery 54. This support 51, also, acts as a mount for the coolant collecting pan 55'.

It has been explained that the work holding chuck 36, the work holding mandrel, and the disc blank W are rotated in one direction, in a step-by-step manner, about the dash line a, which is the true axis of the disc mandrel, to index the disc to the successive locations of the spaces or grooves which occur between adjacent teeth. These space or groove locations, as a result of this indexing, are placed in operative relation to the path of movement of the cutting tool. These spaces or grooves between adjacent teeth are formed by the removal of the disc material. This material, at each space or groove location, is removed by several straight line strokes of the cutting tool. Each stroke of the tool produces a cut of uniform depth, which depth corresponds with the depth of the groove. Each groove tapers radially inwardly and the series of cuts required to remove the material to form a groove are radially arranged with respect to an axis or line which intersects the groove at its narrower, inner end portion. As the cutting tool is only permitted to travel through a straight path, the disc blank must be oscillated about the axis or line with respect to which all of the straight line cuts, required to form a groove, are radially arranged. This oscillatory movement is accomplished by oscillating the table portion 27 and for that reason oscillation of each disc blank must take place about the axis of the bearing portion 26 of the stationary table part 25. This axis of oscillation remains constant and is represented by the dash line b in Fig. 8.

The mechanism employed for effecting oscillation of the upper table part 27 is best illustrated in Figs. 1, 2, 4, and 6 to 8 inclusive.

Figs. 1, 2, 7 and 8 disclose the oscillatable table part 27 as having formed thereon a laterally or radially projecting arm 55. The outer end portion of this arm has pivotally connected thereto, by the pin 56, the inner part 57 of a spring enclosing housing which further includes the outer part 58. The outer part of this spring housing is supported for pivotal movement about a vertical axis by means of the shaft 59 which is journaled in the bearing 60 supported on the left hand rear corner portion of the stationary table part 25. The two parts 57 and 58 of this housing are telescopically associated with each other and the inner housing part 57 is slidable axially relative to the outer housing part 58. A helical, compression spring 59' is enclosed within these housing parts and functions to urge the inner housing part 57 outwardly with respect to the outer housing part 58. An adjustable end bearing member 60 bears against the end of the spring 59' which is received in the housing part 58. This adjustable end bearing is employed for varying the compression force of the spring 59' for any given position of the oscillating table arm 55. It will be seen, therefore, that the spring 59' will normally function to force or urge the oscillating table arm 55 in a counter-clockwise direction, when viewed from above.

Figure 2:
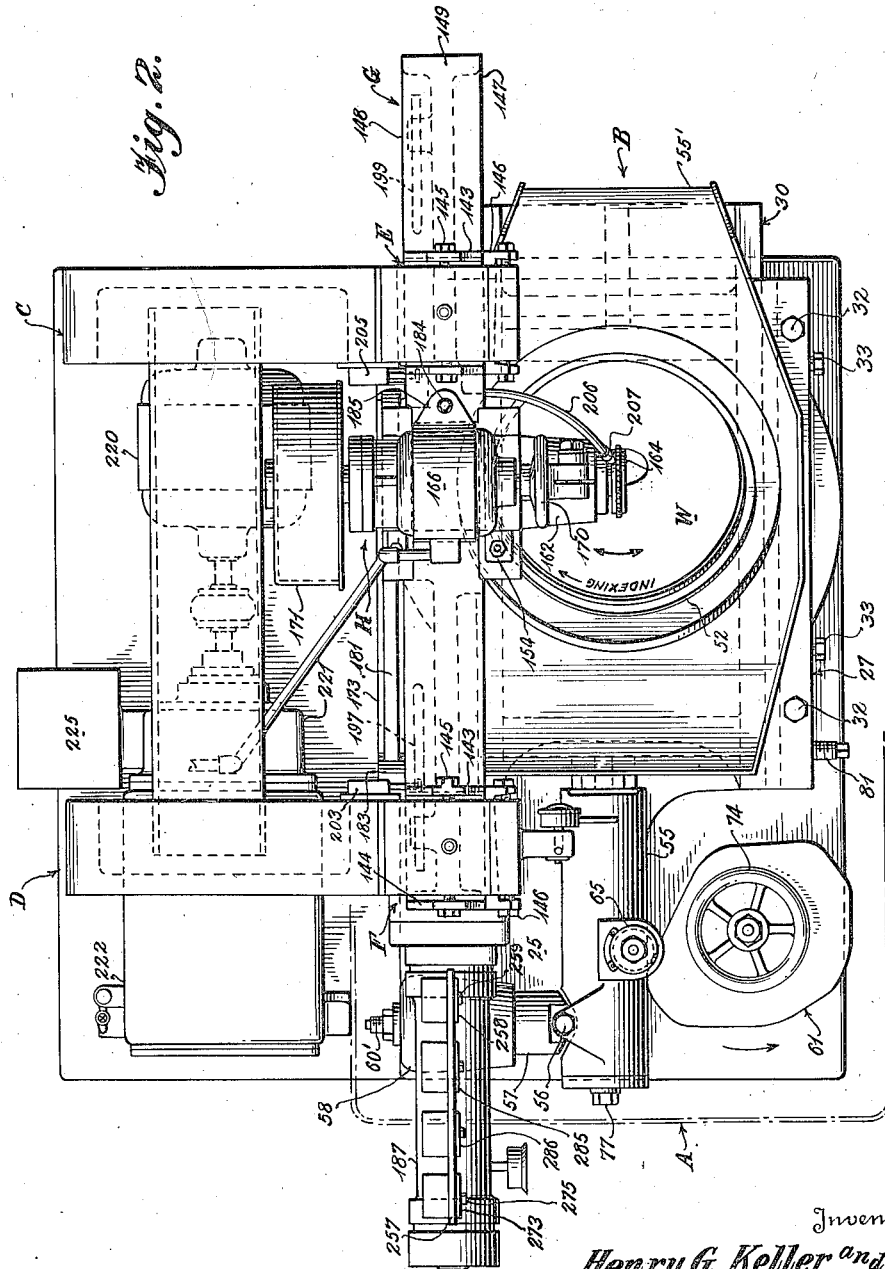
Figure 6:
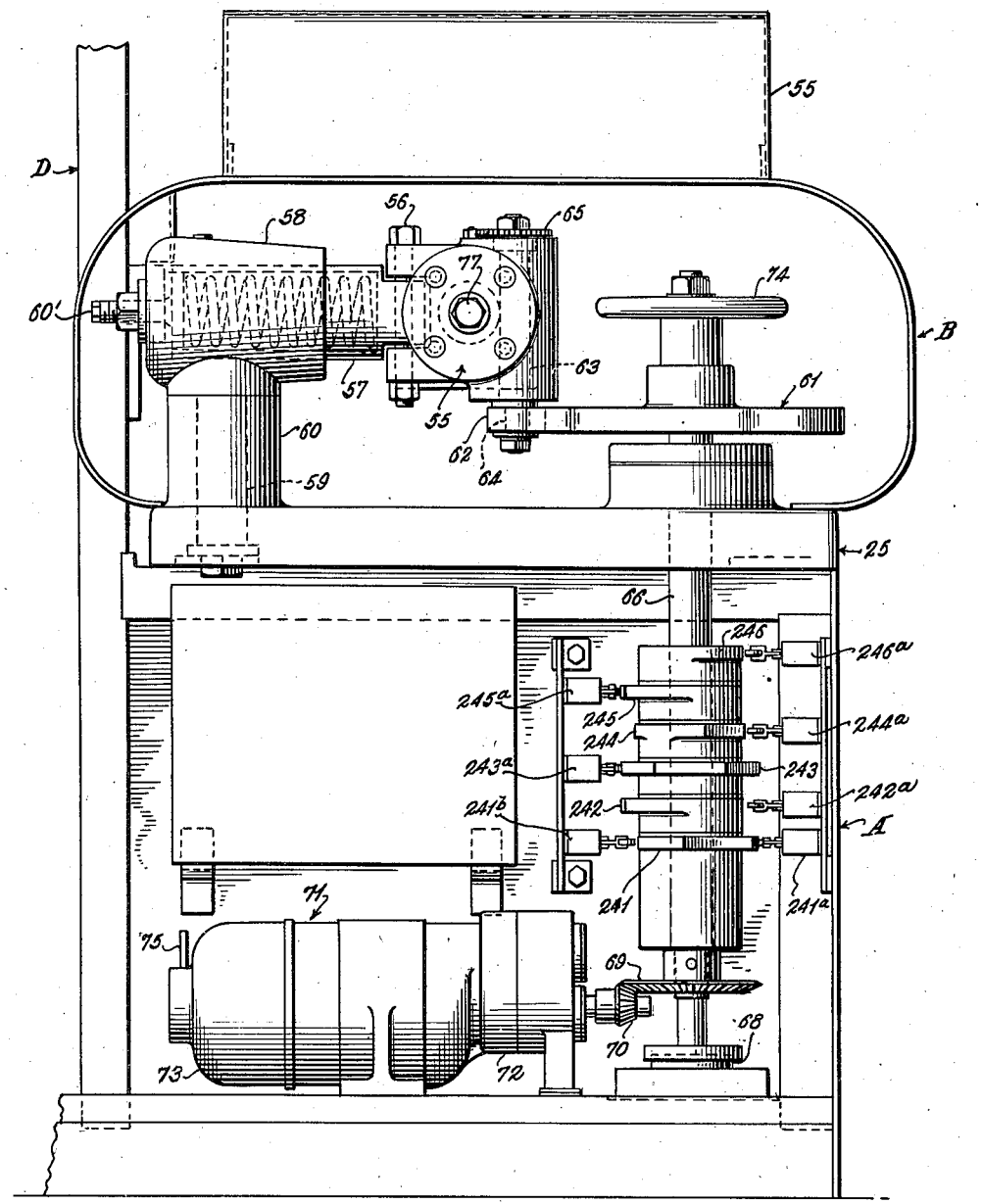

The oscillatory movements of the table part 27 are brought about by a multiple lobe master cam 61 which engages a roller 62 that is mounted on the lower end of the shaft 63 that passes through the table arm 55. Fig. 6 shows the lower end portion 64 of this roller mounting shaft 63 as being eccentrically arranged with respect to the remainder of the shaft. This eccentric portion 64 journals the roller 62. It will be appreciated, therefore, that angular adjustments of the roller supporting shaft 63 will effect variations in the oscillatory movements of the table part 27 and its arm 55 for any given master cam 61. An adjustment indicating scale 65 is illustrated in Figs. 2 and 7 as being associated with the upper end of the roller supporting shaft 63 and the adjacent portion of the oscillating table arm 55.

Figs. 1, 4, 6 and 8 disclose the master cam as being supported by the upper end of a vertical cam shaft 66. This cam shaft is supported at its upper end portion in a bearing 67 that is mounted in the left hand portion of the stationary table part 25. The lower end of this cam shaft is supported in a bearing 68 that is suitably supported within the table base A, see Fig. 8.

Adjacent the bearing 68, the cam shaft 66 has mounted thereon a bevel gear 69 which constantly meshes with a bevel pinion 70. This bevel pinion is driven by a power unit 71. This power unit includes an electric motor with a reduction gear set interposed between the armature shaft of the motor and the bevel pinion 70. This gear set is enclosed within the housing portion 72. The opposite end portion 73 of the power unit housing encloses an electrically controlled brake mechanism. This power unit functions to intermittently rotate the cam shaft 66. The preferred type of master cam 61 is provided with six lobes which are spaced 60° apart. It is the function of the power unit 71 to rotate the master cam 61 six different increments, or 60° six different times, to place the six master cam lobes in engagement with the roller 62 of the table oscillating arm 55. Therefore, starting with lobe number 1 of the master cam 61 in engagement with the roller 62, the electric motor of the power unit 71 will be started and stopped six different times to place lobes 2 to 6 inclusive and then lobe 1 of the master cam 61 successively in engagement with the roller 62. The circuit to the electric motor and the circuit to the electrically controlled brake mechanism will be made and broken six different times to bring about these 60° movements of the cam shaft 66.

The cam shaft 66 is provided with a hand wheel 74 at its upper end by means of which the shaft may be manually adjusted to position any portion of the periphery of the master cam 61 in engagement with the table oscillating roller 62. A manual brake releasing lever 75 is provided so that the brake mechanism may be released whenever it is desired to manually adjust the cam shaft 66.

With this explanation, it will be seen that step-by-step rotation of the master cam 61, in the direction of the arrow line of Figs. 2 and 7, will cause the oscillating table 27 to oscillate back and forth about its axis that is represented by the dash line $b$ of Fig. 8. The extent of oscillatory movement in opposite directions will be governed by the six lobes of the master cam 61. A different master cam may be required for each different sized disc.

As the axis of oscillation of the table 27 is always represented by the dash line $b$, and as the axis of oscillation of the table part 27 must represent the axis with respect to which the several straight line cuts radiate, disc blanks of different sizes must be positioned so that this axis of oscillation $b$ intersects the inner end portion of its groove locations. Fig. 8 illustrates the proper point for the axis of oscillation $b$ to intersect each space or groove at its inner end portion. The disc blank W shown in Fig. 8 is one of the largest sizes of discs that can be handled by this machine. It will be appreciated, therefore, that this disc has a hub portion which is of greater diameter than the hub portions of smaller sized discs. Therefore, when the smaller sized discs are being machined, they must occupy positions to the left of the disc blank position illustrated in Fig. 8.

The compensating chuck table 30 is adjustable horizontally in the guideway 29 of the oscillating table 27 to effect this adjustment of the chuck 36, the work holding mandrel, and the disc blanks with respect to the axis of oscillation $b$. To accomplish these adjustments of the compensating chuck table 30, a rod 76 is connected to the left hand end of the table. This rod passes longitudinally through the table arm 55 and has an adjusting head 77 located at the outer end of the arm. The inner end of this rod is threadedly connected at 78 to the compensating chuck table. A carriage locating gage block 79 is interposed between the end of the compensating chuck table 30 and the surface 80 which is formed on the oscillating table arm 55. A different sized gage block 79 is required for each different sized disc blank. By passing the rod 76 through the proper carriage locating gage block 79 and then tightening up the threaded connection 78 between the rod and the compensating chuck table 30, the said table will be fixed at the proper position for locating the axis of oscillation $b$ at the inner end portion of each tooth space or groove as the disc blank is successively indexed to these groove locations.

When it is necessary to position a different master cam 61 on the upper end of the cam shaft 66, some means must be provided for forcing the oscillating table arm 55, and its roller 62, back away from the master cam periphery against the force of the compression spring 59'. A screw jack 81 is illustrated in Figs. 7 and 8 for accomplishing this desired result. This jack is threaded in the lug 82 that is carried by the stationary table part 25. This lug bears against a shoulder 83 that is formed on the oscillating table part 27.

After a groove has been completely formed at any given groove or space location, it becomes necessary to index the disc blank W to the next space or groove location. This indexing movement takes place around the true axis of the disc blank W, which is represented by the dash line $a$ in Fig. 8. If, for example, sixty teeth are to be formed on the disc blank, the said blank must be indexed one-sixtieth of a complete circle, or 6°. In specifically describing the disclosure of Fig. 8, it was pointed out that the work holding chuck 36 is provided with an indexing ring or wheel 37 which is provided with a desired number of peripheral teeth.

Figure 4:
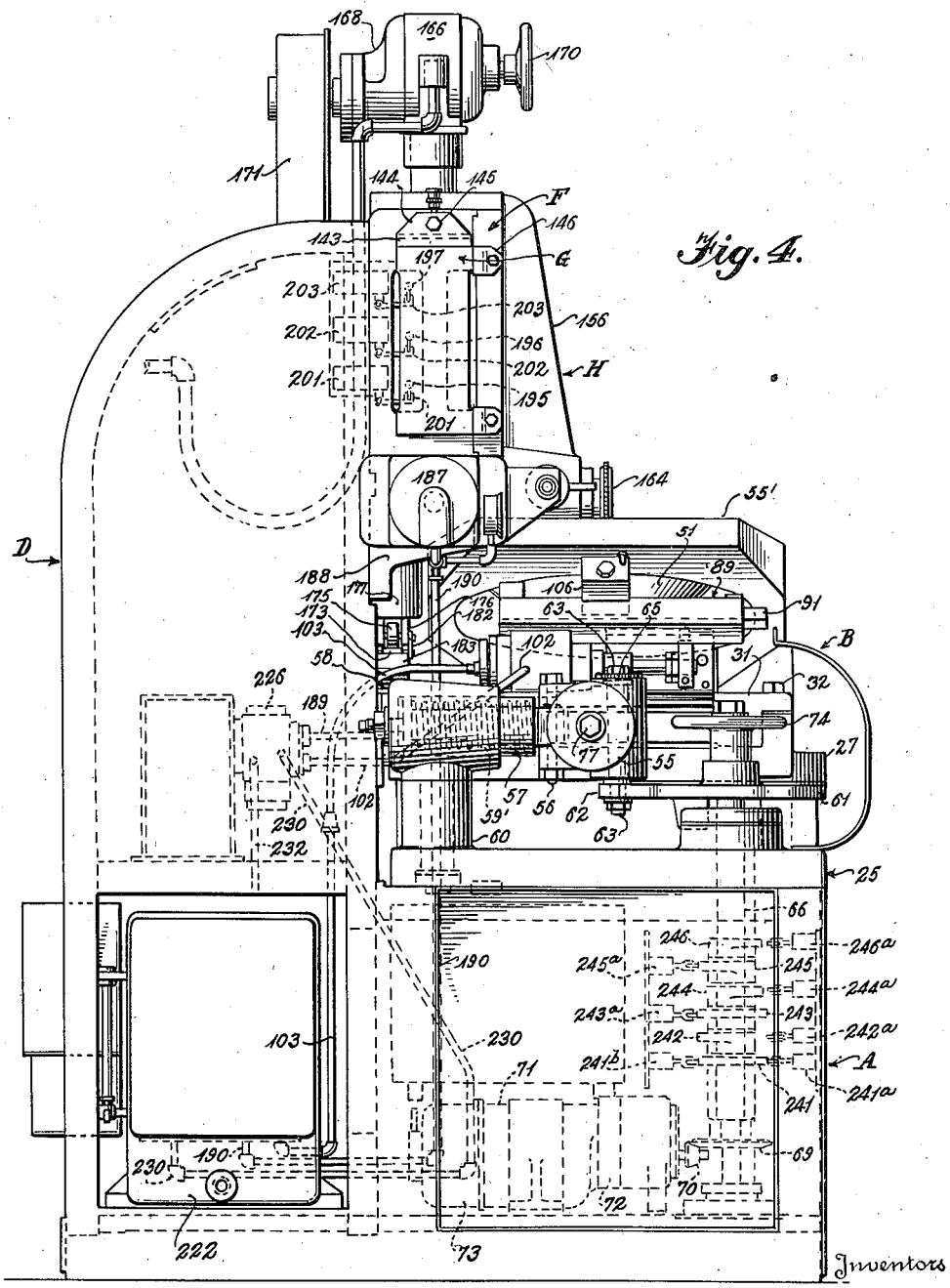

In specifically describing the indexing mechanism, the detail disclosures of Figs. 14 to 18 and the general disclosures of Figs. 1, 4 and 8 will be employed.

These various figures disclose the compensating chuck carriage 30, more specifically its hub portion 34, as having a mounting boss 85 formed thereon. The indexing unit includes a mounting plate 86 which is rigidly attached to the boss 85 by the screws 87 and pins 88. The mounting plate supports a body 89 which is formed with a longitudinally extending slideway 90 which is open at its top throughout the length of the body and is open at its opposite ends. A bar or pawl slide 91 is mounted in this slideway 90 to partake of reciprocatory movements therein. Figs. 14, 15 and 16 disclose the bottom wall of the slideway as being slotted at 92 to accommodate a fork 93 which depends from the pawl slide 91. The spaced sides of this fork receive between the same the finger 94 of a split head 95 that is threadedly adjustably connected to the threaded end 96 of a piston rod 97 that projects from one end of the hydraulic cylinder 98. This split head, after being properly adjusted on the piston rod end 96, has its split portion tightened up by the bolt and nut device 99. The piston rod 97 is provided with a squared end 100 to permit the rod to be rotated relative to the head 95 when the head is to be adjusted relative to the piston rod. A pair of jam or lock nuts 101 are mounted on the threaded portion 96 of the piston rod 97 to limit the piston travel and retain the head 95 in the desired adjusted position with respect to the piston rod 97.

The hydraulic cylinder 98 has mounted therein a double acting piston. The fluid to effect movement of the piston, not shown, to the left in Fig. 16, or so as to draw the piston rod 97 further into the cylinder 98, is admitted through the flexible tube 102 which is connected to the side of the cylinder. The fluid for effecting movement of the piston to the right of Fig. 16 is admitted to the outer end of the cylinder 98 through the flexible tube 103. The fluid in this tube 103 is always under a low pressure, sufficient to keep the piston rod 97 at its extreme right position unless tube 102 admits fluid of a higher pressure. This arrangement insures the normal position to be one in which a centralizing plunger is preventing rotation of the index wheel 37. It will be appreciated, therefore, that by first admitting fluid of a high pressure into the cylinder 98 through the tube 102, the piston rod 97, the head 95 and the pawl slide 91 will overcome the opposing low pressure and all be caused to move to the left of Fig. 16. When high pressure fluid is later released from the inner end of the hydraulic cylinder 98 through the tube 102, the piston rod 97, the head 95 and the pawl slide 91 will be caused to move to the right by the low pressure fluid in 103, or be returned to their starting positions. The low pressure fluid in tube 103 will hold this position.

The pawl slide 91 is retained in its slideway 90 by several elements. One of these elements consists of the strap 104 which is fastened to the right hand end portion of the body 89. At the opposite end of this body, the pawl slide is held in the slideway by the casing of a micro switch 105. Intermediate the ends of the body 89, the pawl slide is retained in place by a plunger supporting and guiding body 106.

This plunger support 106 is provided with a guideway or bore 107 which extends longitudinally thereof. Mounted for reciprocatory movement in this bore or guideway is a centralizing plunger 108 which is loaded or constantly urged outwardly of the guideway 107 by the compression spring 109 which occupies the outer end portion of the guideway 107. One end of this centralizing plunger 108 projects beyond the end of the supporting body 106 and is pointed, or wedge shaped, as at 110, to enter the spaces between the teeth 37a of the indexing ring or wheel 37. This spring loaded plunger 108, therefore, is employed for retaining the toothed indexing ring or wheel 37, and the work holding chuck 36 in each new position after the indexing mechanism has been operated to advance the disc blank to the next space or groove location.

The plunger 108 is provided with a transverse slot 111 which registers with a transverse slot 112 formed in the plunger guide and support 106. A bearing pin 113 passes through the slot 111 of the plunger and is employed to engage the arm 114 of the pull-out lever 115 that is pivotally mounted on the outer side of the body 89 by the pin 116. This pull-out lever 115 is formed with a tapered actuating finger 117 which normally overlies the pawl slide 91. Fig. 14 shows the centralizing plunger 108 and the pull-out lever 115 in their normal positions which they are caused to assume by the spring 109.

The pawl slide 91 has mounted thereon the pull-out pawl 118 by means of the pivot pin 119. The stop post 120 backs up the pull-out pawl 118 and the tension spring 121 functions to normally hold the pawl 118 in engagement with the post 120. This pull-out pawl is provided with a finger 122 that is tapered and is arranged to engage the finger 117 formed on the pull-out lever 115 when the pawl slide 91 is reciprocated. In other words, when the pawl slide 91 is moved to the left of Fig. 14, the finger 122 of the pull-out pawl 118 will engage the finger 117 of the pull-out lever 116. Further movement of the pawl slide 91 to the left will cause the pawl 118 to pivot the lever 115. This pivotal movement of the lever will retract the centralizing plunger 108 for withdrawing its outer end 110 from between two teeth of the indexing ring or wheel 37. The pawl 118 will move past the finger 117 of the lever 115 during movement of the pawl slide 91 to the left. When the pawl slide is returned to its normal position, the centralizing plunger 108 will have moved outwardly to locate its end 110 in the next adjacent tooth space. The spring 121 will permit the pull-out pawl 118 to pivot about its post 119 to permit the pawl finger 122 to slide past the lever finger 117.

The pawl slide 91 has the indexing pawl 123 pivotally mounted thereon by means of the pin 124. This pawl is provided with a toothed outer end 125 that is moved into engagement with the successive teeth 37a of the indexing ring or wheel 37 as the pawl slide 91 is moved to the left. To guide the tooth engaging action of the indexing pawl 125, this pawl is provided with a slot 126 that slidably receives the guide pin 127.

The micro switch 105, previously referred to, is provided with an operating lever 128 that carries a roller 129 at its outer end for engagement with the upstanding pin 130 carried by the pawl slide 91.

The operation of this indexing mechanism now will be described. After the final groove producing cut has been made at a given groove location on the disc blank W, the indexing mechanism is automatically placed in operation to advance the disc blank to the next space or groove location. To accomplish this operation of the indexing mechanism, fluid is admitted to the hydraulic cylinder 98 through the hose connection 102. The piston in the cylinder 98 is moved to the left of Fig. 16, which is also to the left of Fig. 14. This movement of the fluid piston causes the pawl slide 91 to move to the left. This movement of the slide 91 causes the pull-out pawl 118 to actuate the pull-out lever 115 for retracting the centralizing plunger 108. Movement of the pawl slide 91 to the left also causes the tooth 125 of the indexing pawl 123 to engage a tooth 37a of the indexing ring or wheel 37. This engagement of the indexing pawl 123 with the indexing ring or wheel 37 occurs in proper timed relation to the withdrawal of the end 110 of the centralizing plunger 108 from between two of the teeth 37a. Further movement of the pawl slide 91 to the left causes the indexing pawl 123 to move the indexing ring or wheel 37 the pitch of one tooth 37a. After this indexing movement of the ring or wheel 37 by the indexing pawl 123, the centralizing plunger 108 moves outwardly to occupy the next tooth space and the pawl slide 91 may then be returned to its normal position by being moved to the right. This movement of the pawl slide is accomplished by admitting fluid to the outer end of the hydraulic cylinder 98 through the hose connection 103.

The movement of the pawl slide 91 to the left of Fig. 14 has caused the pin 130 to engage the roller 129 of the micro switch operating lever 128. This switch 105 is connected in an automatic control circuit by wires arranged in the flexible conduit 131. Actuation of the switch lever 128 causes the circuit through the switch 105 to be closed and the closing of this circuit causes a new groove cutting cycle to be started. In this way, the successive groove cutting cycles will not be started until after each indexing operation is completed.

Before describing the cutter tool and the mechanism for driving the tool, feeding the tool radially of the disc blank to produce the series of straight line cuts, and raising and lowering the tool to control the radial contour provided for the bottoms of the grooves, it is believed to be desirable to describe the strokes of the milling cutter that are employed for producing each individual groove. These movements, or feed strokes, of the milling cutter will be explained in connection with the disclosures provided by Figs. 8, 19 and 20.

Figs. 8 and 19 disclose a disc blank W in the position it assumes in the machine while its spaces or grooves are being cut. The work holding mandrel and chuck have already been described as have the mechanisms that are employed for indexing the disc blank about its true axis $a$ and for oscillating the blank at each space or groove location about the line $b$ which is angularly arranged with respect to the true axis $a$. These index and oscillation axes have been reproduced for the disc blank that is diagrammatically shown in side elevation and in top plan in Fig. 19. It has been indicated above that each space or groove, that occurs between adjacent teeth, is produced by a series of straight line cuts which are so arranged relative to each other that they collectively remove all of the material necessary to produce the groove. These straight line cuts are all radially arranged with respect to the axis of oscillation $b$. By employing a milling cutter of cylindrical form with teeth on the circumferential surface and on both sides, and by constantly rotating the cutter in the same direction, each groove can be produced very satisfactorily by six cuts. Considerable cutting time can be saved by causing the milling cutter to remove material during each one of its strokes; i. e., during out-strokes as well as during in-strokes. With the milling cutter constantly rotating in the direction of the arrow lines 131 of Fig. 8, it will be appreciated that the in-strokes will be performed by up-milling while the out-strokes will be performed by down-milling.

Fig. 19 discloses at P a diagram or pattern of these six strokes. The lines representing these strokes are provided with arrows to indicate the alternate directions of the cuts. These lines of this pattern, also, indicate the relative lengths of the cutting strokes as well as the overrun 132 in advance of the first cut and the overrun 133 that follows the completion of the sixth cut. Dotted lines 134 are employed to indicate the indexing movement of the disc blank between each cutting cycle. Because the grooves are tapered radially inwardly, it is not necessary for all of the cutting strokes to be of the same length. If the first two strokes are so angularly arranged with respect to each other that they product the adjacent flanks or side faces of the two teeth which bound a groove, the wedge of material left between these first two cuts will be considerably shorter than the overall length of the groove. Material can be removed from both sides of this wedge by strokes which are shorter than the initial two strokes. This pattern P, therefore, shows strokes 3 and 4 as being shorter than strokes 1 and 2. After the removal of material by the second and third strokes, the remaining wedge of material can be completely removed by two additional strokes which are even shorter than strokes 3 and 4. For this reason, the pattern shows strokes 5 and 6 as being the shortest.

Fig. 20 discloses in six views the production of a complete groove by six straight line cuts that are radially arranged with respect to the axis of oscillation $b$. The several views of this figure also disclose the center line of the tooth space as completed and the center line of each cut. The center line of the tooth space always intersects the true axis of the disc blank, which is indicated by the reference character $a$. The center line of each cut intersects the axis of oscillation, which is indicated by the reference character $b$. The center lines of the various cuts, however, are always angularly arranged with respect to the center line of the tooth and for that reason they do not intersect the true axis $a$. The center lines for the separate cuts will be given the reference characters $C^1$ to $C^6$ for the purpose of identifying the same.

In the first view of Fig. 20 the disc blank W has been oscillated in the direction of the arrow lines $A^1$ about the axis of oscillation $b$ to position the disc for the first straight line cut. This first cut starts at the periphery of the disc and extends into the inner margin of the conical face of the disc, or just beyond the point where the axis of oscillation $b$ intersects the groove location. This first cut forms the flank or side face 135 of one of the two adjacent teeth. Due to the direction of oscillation of the disc blank about the line $b$ in the direction of the arrow lines $A^1$, the first cut forms the left hand side of the groove, when viewed from the periphery of the disc, and the tooth flank 135, therefore, is the right hand side face of a tooth.

The second straight line cut is shown in the second view of Fig. 20. This second cut forms a tooth flank 136 which, of course, is the left hand side face of the next adjacent tooth. To position the disc blank relative to the milling cutter for this second cut, the blank is oscillated about the axis $b$ in the direction of the arrow lines $A^2$. These two cuts intersect at the inner end of the groove and leave a wedge of material 137 which must be removed by subsequent cuts. It will be noted, however, that this wedge of material is substantially shorter than the overall length of the groove which has thus far been defined by the first two cuts.

To position the disc blank for the third cut, the blank is oscillated in the direction of the arrow lines $A^3$. This third cut removes material from the right hand side of the wedge 137. The fourth view of Fig. 20 discloses the condition of the groove after the fourth cut has been completed. This cut removes material from the left hand side of the wedge 137 and for that reason the disc blank must be oscillated in the direction of the arrow lines $A^4$.

The fifth view of Fig. 20 shows the condition of the groove after the fifth cut has been completed. This fifth cut removes material from the left hand side of the wedge 137, or the same side of the wedge from which the material was removed by the fourth cut. However, to position the disc blank for this fifth cut, it must be oscillated in the direction of the arrow lines $A^5$.

The sixth view of Fig. 20 discloses the completed groove 138. To complete the groove, the wedge 137 shown in the fifth view is completely removed. To position the disc for this sixth cut, oscillation must occur in the direction of the arrow lines $A^6$.

Fig. 8 discloses the milling cutter in five different positions. These positions will be compared with the pattern P of Fig. 19. Position $P^1$ is assumed by the milling cutter when the disc blank W is being indexed to new space or groove locations. This position $P^1$ is well beyond the periphery of the disc blank. After the disc blank has been indexed to a new location, the milling cutter moves into position $P^2$ and this movement is represented by the overrun line 132 of Fig. 19. The milling cutter does not stop in this position $P^2$ in making the first cut but continues on to position $P^3$. This latter position carries the peripheral teeth of the milling cutter just beyond the inner end of the groove, or just sufficient to clear the teeth of the cutter from the disc blank so that the blank can be oscillated to the position for stroke or cut number 2. In making cut number 2, the milling cutter travels outwardly until it assumes position $P^2$ when it stops. This position $P^2$ just permits the teeth of the milling cutter to clear the periphery of the disc so that the disc blank may be oscillated to position the same for the third cutting stroke of the milling tool. In making this third stroke, the tool moves to position $P^4$. While in this position $P^4$, the disc is oscillated to arrange the same for the fourth stroke or cut. In making this fourth cut, the milling tool moves radially outwardly until it assumes position $P^2$. The disc blank is then oscillated to arrange the same for the fifth stroke. In making this fifth cut, the wheel moves into position $P^5$ and then stops while the disc blank is oscillated to position the same for the sixth and final cut. In making this last cut, the milling tool moves from position $P^5$ out to the indexing position $P^1$. While in this last mentioned position, the disc blank is indexed to the location of the next space or groove.

The mechanism for supporting the milling cutter while it is moving through its cutting strokes and forming the contour of the bottoms of the tooth spaces or grooves, as well as the feeding and driving means will now be described. Figs. 1 to 5 inclusive disclose this cutter mechanism in connection with disclosures of the complete machine while Figs. 9 to 13 inclusive disclose the cutter mechanism more in detail.

The machine frame was previously described as including upright posts C and D which carried tool beam guides E and F at their upper ends. These tool beam guides E and F consist of main body castings 140 which are attached to front faces of the upright posts C and D by the securing screws 141. These body castings form three sides; i. e., the inner side and the top and bottom, of two spaced beam guideways. The outer side of each one of these guideways is closed by a removable plate 142. These front wall plates are made removable to facilitate assembly and disassembly of the tool beam.

To assure proper movement of the beam through these guideways and to compensate for wear, wedge shaped shoes 143 are interposed between the top surface of the beam and the inner surface of the top of the body casting 140. These wear shoes 143 are provided with end flanges 144 through which adjusting screws 145 extend. By means of these opposed adjusting screws, these top wear shoes can be adjusted transversely of the guides, or longitudinally of the tool beam. Due to the tapered dimensions of these shoes and the cooperating tapered surfaces of the tops of the guide body castings 140, longitudinal adjustments of these shoes 143 will compensate for wear of the beam, etc., so that motion of the beam in its guides will be prevented vertically. Similar wear shoes 146 are interposed between the inside of the removable plate 142 of each tool beam guide. These wear compensating shoes 146 are wedge shaped and are longitudinally adjustable in the same manner as the shoes 143. Therefore, further description of the shoes 146 is deemed to be unnecessary.

The tool beam G is of I-section throughout most of its length. The top and bottom flanges of this beam provide front and rear bearing surfaces 147 and 148 respectively and top and bottom bearing surfaces 149 and 150 respectively. These bearing surfaces of the tool beam cooperate with the bearing surfaces provided by the shoes 143 and 146 and the oppositely arranged bearing surfaces formed on the guide bodies 140 to assure smooth, steady reciprocating movements of the tool beam.

These reciprocating movements of the tool beam G are employed for feeding the milling cutter radially of the disc blank at the space or groove locations to produce the straight line up-milling and down-milling cuts.

All of the disc blanks have conical surfaces or faces in which the grooves are cut to produce the teeth. These conical surfaces may be provided with different forms of radial contours. The conical surfaces may be straight or flat radially or the contour of any desired number of the discs may be curved. The curvature may be convexed, concaved, or a combination of both. The tops of the teeth and the bottoms of the grooves preferably should be of the same contour. The present, preferred embodiment of the invention; i. e., the present preferred practice, is to provide the finished discs with convexed contours and with the teeth of uniform depth throughout their radial lengths. The machine embodying this invention is capable of cutting the teeth in conical disc blanks so that they will have any of the aforementioned types of contours. To accomplish this desired result, the milling tool must be capable of partaking of vertical movement relative to its supporting beam G. The mounting of the milling tool to allow for desired vertical movements now will be described.

Fig. 10 discloses the intermediate portion of the tool beam G as being provided with a bearing enlargement 151. This enlargement is provided with front and rear, vertical bearing surfaces 152. Guide strips 153 are arranged at one side of each one of these bearing surfaces 152. Guide strips 154 are arranged on the opposite sides of the bearing surfaces 152. These guide strips 153 and 154, therefore, cooperate with the bearing surfaces 152 to form front and back guideways. Each one of the guide strips 154 is provided with an adjustable, wedge shaped shoe 155 which carries an adjusting screw 155a at its upper end. By adjusting these shoes vertically, the width of these guideways can be varied for the purpose of compensating for any wear and for assuring a smooth, steady vertical movement of the milling tool relative to the beam G.

Figs. 1, 3, 4, 9, 10 and 12 disclose a cutter head 156 which is formed with a substantially rectangularly shaped opening 157 through which the beam G passes. This rectangular opening is defined at its front and rear by bars 158 and 159. Fig. 10 discloses these bars as cooperating with the bearing surfaces 152 and the guide strips 153 and 154 of the intermediate portion of the tool beam G. Figs. 10 and 12 best disclose a wedge shaped shoe 160 as being interposed between the front bearing surface 152 of the beam G and the inner surface of the front bar 158 of the cutter head. This shoe 160 is vertically adjustable by means of the screws 161. By means of this shoe 160, any wear occurring in connection with the bearing surfaces 152 may be taken care of. In other words, this adjustable shoe 160 will further assure the cutter head 156 of partaking of smooth vertical movement relative to the intermediate portion 151 of the tool beam.

The cutter head 156 is provided at its lower end with a cutter spindle housing 162 that mounts the cutter spindle 163 in suitable bearings. The front end of this spindle is adapted to have mounted thereon the milling cutter 164. The rear end of the spindle 163 projects from the housing 162 for having mounted thereon the combined flywheel and driven sheave 165.

The upper end of the cutter head 156 has vertically adjustably mounted thereon an electric motor 166. This motor drives the driver sheave 167 through a suitable speed reducer gear set, not shown, which is enclosed within the housing portion 168. Suitable V-belts 169 are trained over the sheaves 165 and 167 and result in driving the cutter spindle 163 by means of the motor 166. Sheave 167 is a variable pitch sheave. This provides variable speed for the cutter rotation. To decrease the pitch of sheave 167, the motor position is adjusted to increase the V-belt sheave centers. The V-belt tension produced is sufficient to push the V-belt deeper into the grooves in sheave 167 thus reducing the pitch diameter. This action results in a slower cutter speed. Faster cutter speed is obtained by lowering the motor to decrease the sheave centers and in turn increase the pitch diameter of sheave 167. A hand wheel 170 is positioned on the front end of the armature shaft of the motor 166 and may be used to manually rotate the milling cutter 164.

A suitable guard or casing 171 is provided for enclosing the sheave and belt drive from the motor 166 to the cutter spindle 163. Suitable bracket arms 172 are employed for supporting the drive guard 171 on the cutter head 156.

The vertical movements of the cutter head 156 are controlled by a cam and roller mechanism which is best disclosed in Figs. 3, 5, 9 and 12. A simple cam 173, of any desired contour is suitably mounted on the supporting bar 174 which is attached to the upright posts C and D. The top camming surface of the cam 173 is engaged by a roller 175 that is carried by the mounting member 176 which is vertically adjustably received within the sleeve or tubular boss 177 depending from the spindle housing 162. An adjusting screw 178 is positioned within the sleeve or tubular boss 177 and allows manual adjustment of the roller mounting member 176 relative to the boss 177. A key and keyway structure 179 is provided for preventing rotation of the roller mount 176 within the bore of the boss 177.

Figure 9:
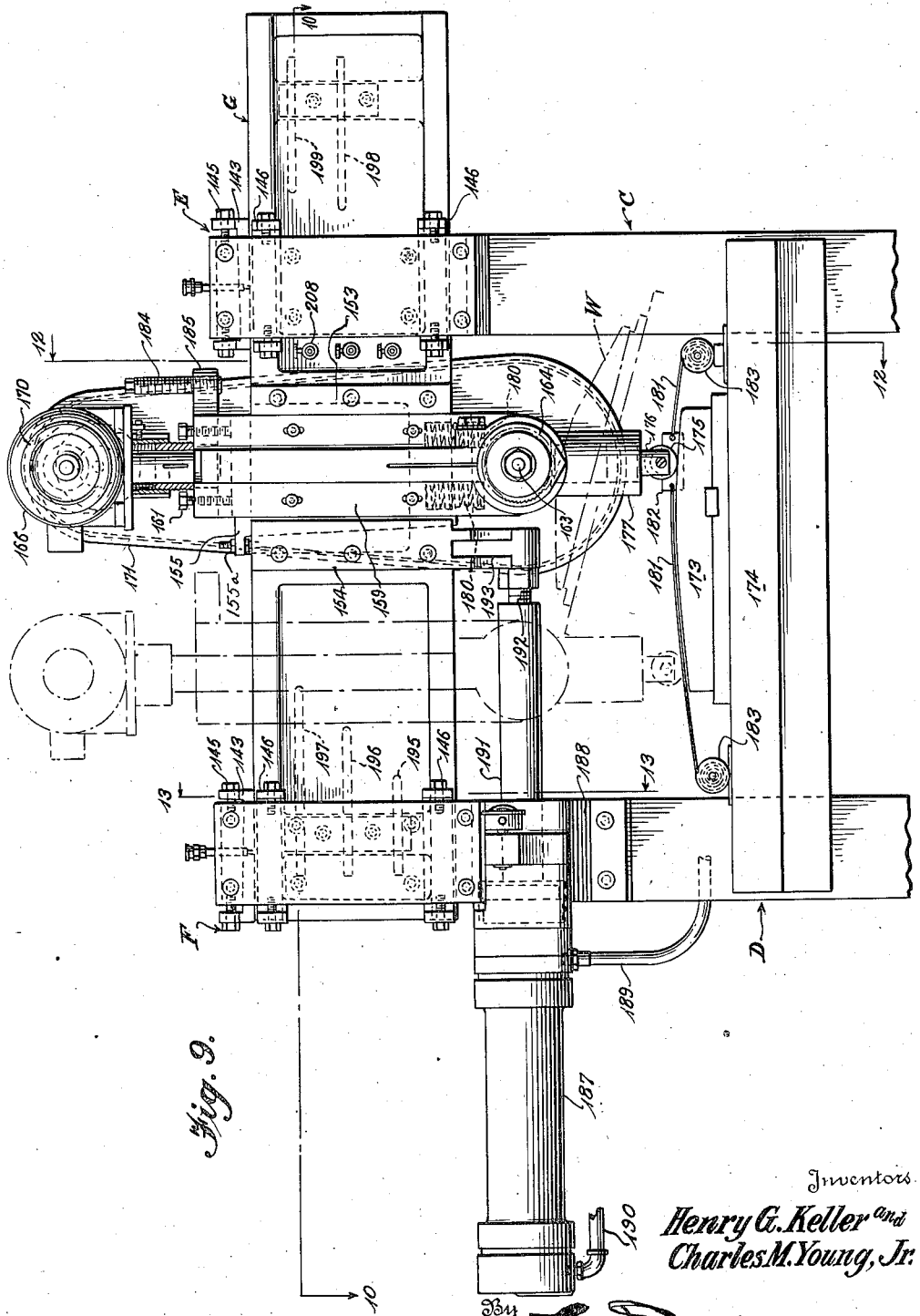

Figs. 9 and 10 disclose four compression springs 180 which are interposed between the enlarged bearing portion 151 of the tool beam G and the spindle housing portion 162 of the cutter head. These four springs and the weight of the cutter head function to maintain the roller 175 in contact with the top camming surface of the cam 173. It will be apparent, therefore, that the milling cutter 164 will provide the disc blanks with radial contours which correspond identically with the contour of the cam 173.

Figure 5:
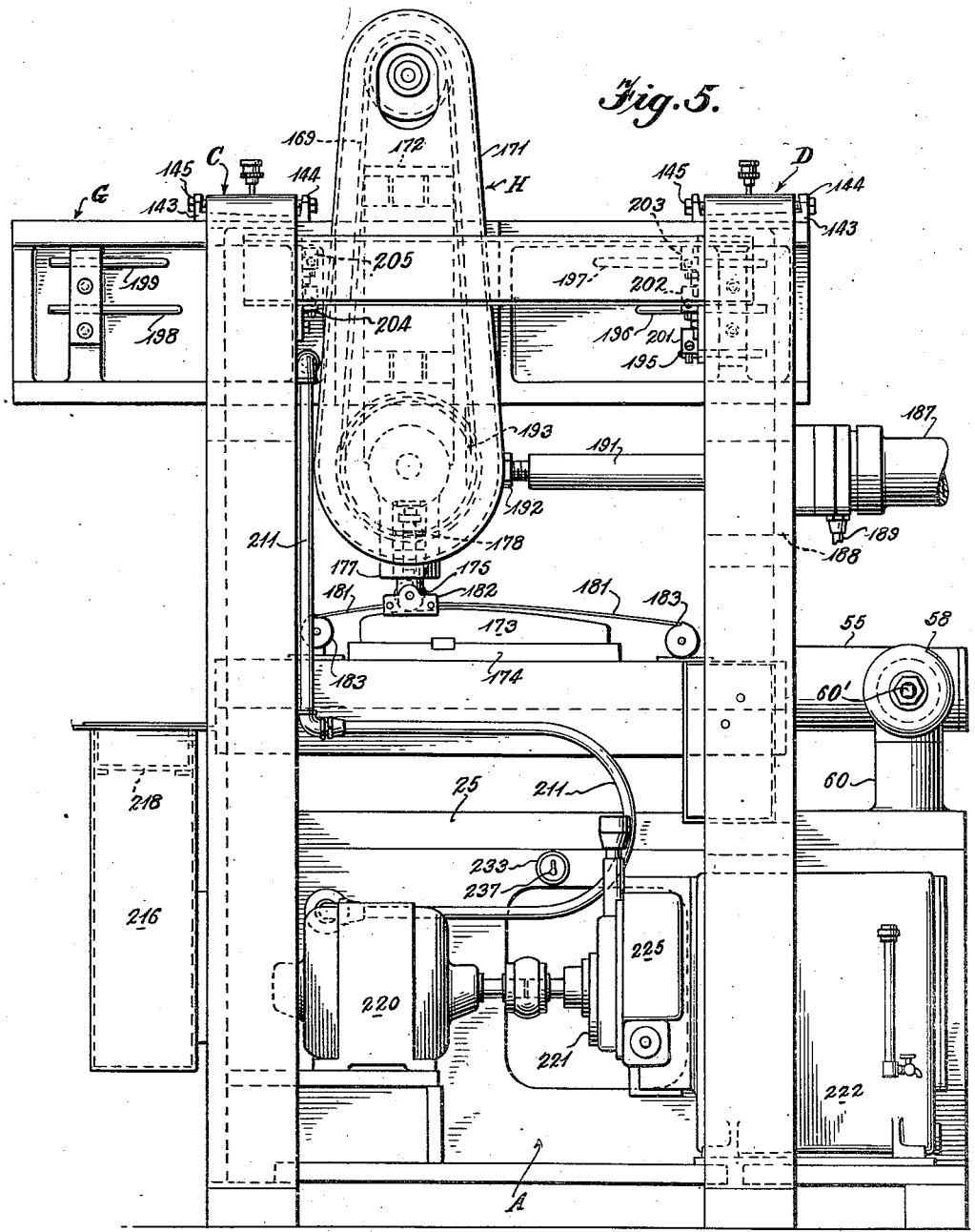

To prevent the top surface of the cam 173 from accumulating foreign matter, protecting ribbons 181 are shown in Figs. 5 and 9 as being attached at their outer ends to the roller 175 by means of the bracket 182. The remaining ends of these protecting ribbons 181 are attached to spring tensioned take-up spools 183 which are mounted beyond the opposite ends of the cam 173.

When it is desired to change the cam 173 to obtain a new disc contour, the load of the cutting head must be removed from the cam. Mechanism to accomplish this desired result is disclosed in Figs. 1, 2 and 9. It consists of a screw jack 184 which is threaded in an ear 185 that is formed on the upper end of the cutter head 156. By rotating this screw jack in the proper direction to cause it to feed down through the ear 185, the lower end of the jack will bear against the top of the tool beam G. The cutter head can be lifted so that the cam roller 175 will be moved away from the cam 173. A suitable wrench, or the like, 186 may be provided for operating the screw jack.

Of course, some power means must be provided for reciprocating the tool beam G to feed the milling cutter 164 relative to the disc blank. Figs. 1, 4, 5, 9, 10, 12 and 13 disclose a hydraulic cylinder 187 which is attached to the mounting portion 188 of the beam guide F. This hydraulic cylinder 187 is provided with a double acting piston, not shown, which is moved to the left, when viewed from the front of the machine, by fluid admitted to the inner end of the cylinder through the flexible tube 189 and is moved to the right by pressure fluid admitted to the outer end of the cylinder 187 through the flexible tube 190. The piston is provided with a piston rod 191 which extends lengthwise of the tool beam G for adjustable connection at 192 with an arm 193 that depends from the tool beam G at a point close to the location of the tool head 156.

In describing the stroke pattern P of Fig. 19, the successive cuts of Fig. 20, and the different positions of the milling tool in Fig. 8, it was pointed out that the milling cutter is fed through several different lengthed strokes. These strokes of the cutter, of course, result from reciprocating movements of the tool beam G. Automatic controls must be provided to limit the movements of the tool beam in the opposite directions which produce the feed strokes of the milling cutter. This automatic mechanism includes a series of switch tripping fingers 195 to 199 inclusive which are disclosed in Figs. 2, 4, 5, 9, 10, 11, and 13 as being longitudinally adjustably clamped on the rear side of the opposite end portions of the tool beam G. Clamping plates or strips 200 are provided for this purpose. By considering the rear and front elevational views respectively provided by Figs. 5 and 9, it will be seen that these fingers are arranged, or are of proper length, to cause their free end portions to be spaced different distances from their respective outer ends of the tool beam G. Figs. 3, 4, 10, 11 and 13 disclose a corresponding number of limit switches which are mounted on the inner sides of the upright posts C and D so that they will be operated by the said fingers as the beam is reciprocated. Switches 201, 202 and 203 are operatively associated with the fingers 195, 196 and 197 while switches 204 and 205 are operatively associated with fingers 198 and 199 respectively. The several figures disclose the switches as having operating levers carrying rollers which are adapted to engage the fingers. Trip finger 195 and its associated switch 201 will operate to stop the travel of the tool beam G at the end of instroke number 1 while fingers 196 and 197 with their respective switches 202 and 203 will function to stop the tool beam G at the ends of instrokes 3 and 5. Trip finger 198 and its associated switch 204 will function to stop the tool beam G at the ends of out-strokes numbered 2 and 4 while trip finger 199 and its associated switch 205 will function to stop the tool beam at the end of the out-stroke number 6.

Figure 3:
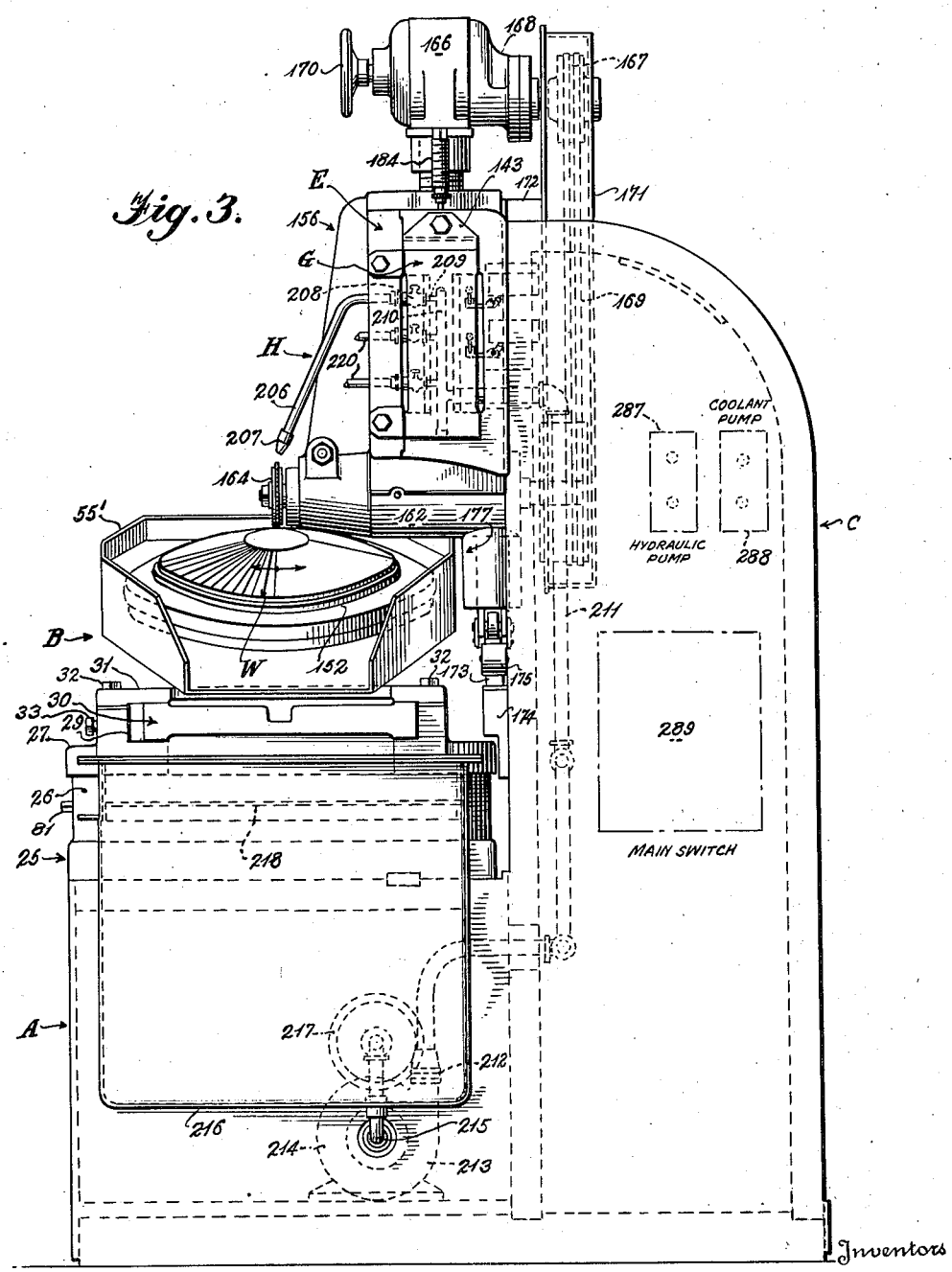

Figs. 3 and 12 disclose a coolant oil delivering tube 206 which terminates at its outer end in a suitable nozzle 207 that is arranged to direct a stream of oil onto the milling cutter 164. This tube is connected to a valve 208 that is threaded in a tapped opening 209 formed in the tool beam G to the right of the cutter head 156. This tapped hole 209 communicates with a vertical duct 210 that is drilled in the tool beam. This duct 210 is connected to a pipe line 211, see Figs. 1, 3, 5, 8 and 12, which extends downwardly of the back of the machine to enter the turret supporting base A for connection with the outlet 212 of the oil pump 213 that is directly driven by the electric motor 214. The inlet of this oil pump has connected thereto the pipe line 215 which extends into the bottom portion of the coolant oil reservoir 216. The inner end of this pipe line 215 has mounted thereon a strainer 217 through which the oil passes in flowing from the reservoir 216 into the pipe 215 and then into the pump 213. This coolant oil delivered to the milling cutter, of course, cools the cutter and the portion of the disc blank being worked upon. The coolant oil delivered from the nozzle 207 naturally flows over the surface of the disc blank and flushes the metal chips into the oil collecting pan 55'. The bottom of this pan is inclined and spills at its discharge end into the upper end of the coolant oil reservoir 216. A removable strainer basket 218 is positioned in the upper open end of the reservoir 216 and functions to separate the chips from the oil. Figs. 1, 3 and 12 disclose additional valves 219 which communicate with the coolant distributing duct 210. These valves have connected thereto delivery pipes 220 which may be employed for carrying the coolant oil to different parts of the oil collecting pan, or the like, for aiding in disposing of the metal chips. These additional coolant delivering pipes 220 are not fully disclosed with reference to their function of delivering the coolant oil to different portions of the collecting pan 55'.

The tool beam reciprocating cylinder 187 and the indexing mechanism operating cylinder 98 must be provided with fluid under pressure at controlled points in the operating cycle of the machine to cause the milling cutter to move through its series of groove producing strokes and to cause the wheel blank to be indexed to a new space or groove location after the completion of each groove. The hydraulic system that provides the fluid pressure for these two cylinder devices will now be described. This system includes an electric motor 220 which directly drives an oil gear pump 221. This pump is mounted on and supported by one side of an oil casing or reservoir 222. Figs. 2 and 5 clearly disclose the electric motor 220, the gear pump 221 and the oil casing 222. Fig. 4 discloses one end of the oil casing. The said casing, also, is shown in the schematic diagram presented by Fig. 19. The oil gear pump 221 has built in its casing a four-way valve which is diagrammatically shown in Fig. 19 and designated by the reference character 223. This four-way valve is operated by two solenoids R and S which are diagrammatically shown in Fig. 19. These two solenoids are enclosed within the casing 225 which is illustrated in Figs. 2 and 5. The solenoid R is intended to operate the four-way valve 223 to cause oil to flow from this valve through pipe 190 into the outer end of the tool beam reciprocating cylinder 187. This pressure fluid will cause the milling cutter to make an in-stroke, or to move from the periphery of a disc blank toward its axis. The solenoid S is intended to operate the four-way valve 223 to cause the pressure fluid to be delivered to the inner end of cylinder 187 through the tube 189. This tube 189, however, is shown in Figs. 4 and 19 as extending to a second four-way valve 226. Fig. 19 discloses the valve member 227 in its normal position in which it is held by the spring 228. A solenoid 229 operates to move this valve body 227 out of the position illustrated in Fig. 19. With the valve body positioned as shown, the tube 189 is normally connected to the pipe line 230. This pipe line 230 extends to the four-way valve 223. Therefore, when solenoid S is energized, it operates the four-way valve 223 for causing the oil to flow through pipe 230 into the casing of the four-way valve 226 and out of this casing into the tube 189 for delivery to the inner end of the beam reciprocating cylinder 187. These solenoids R and S, of course, are operated in proper timed relation to control not only the direction of travel of the milling cutter but also the extent of travel in both directions.

Fig. 19 discloses the indexing cylinder 98 with its piston 231 in the position it occupies while the indexing mechanism is idle. The piston is moved into this position by low pressure fluid that is admitted to the cylinder 98 through the tube 103. This fluid remains under this low preessure all the time that the machine is operating. This tube is shown in Figs. 4 and 19 as extending to the four-way valve casing 223. Therefore, this four-way valve casing 223 operates to admit a constant low pressure fluid to the tube 103 while the machine is in operation causing piston 231 to remain in the position shown in cylinder 98, until a fluid under greater pressure is admitted to the cylinder 98 through tube 102. When it is time for the disc blank to be indexed to a new position, high pressure fluid is admitted to the indexing cylinder 98 through the tube 102 which overcomes the low pressure effect on the piston 231. This tube extends to the casing of the four-way valve 226 where it is normally connected through this casing to a fluid return line 232 that connects with the oil casing 222. When the solenoid 229 is energized, it moves the valve body 227 through the four-way valve casing 226 and this movement of the valve body will connect the tube 102 with the pipe line 230 that extends to the four-way valve 223. High pressure fluid is then delivered to the indexing cylinder 98 to move the piston 231 for actuating the pawl slide 91.

Fig. 5 discloses a switch 233 which is mounted on the back of the turret supporting base A. Fig. 19 discloses this switch as being connected by wires 234 to a solenoid 235. This solenoid actuates a lever 236 which extends into the four-way valve casing 223. This switch 233 is provided with an operating button 237 which is movable into two different positions. It is the function of this switch 233, the solenoid 235 and the operating mechanism 236 to regulate the four-way valve mechanism 223 to provide a fine feed for the milling cutter during its in-strokes and out-strokes.

Figs. 1, 6, and 8 disclose the cam shaft 66 as having mounted thereon six different cams which will be identified by the reference characters 241 to 246 inclusive. Fig. 6 discloses switch 241a and switch 241b as being operated by cam 241. This figure also discloses switches 242a to 246a as being operated by cams 242 to 246 respectively. Each one of these switches includes an operating lever with a roller which is to be engaged by the one or more lobes of the cams.

Referring now to Fig. 19, it will be seen that the various cams 241 to 246 are diagrammatically associated with the cam shaft 66. The arrangement of the cams on this figure, however, is changed slightly for better grouping with reference to the control elements that are operatively connected with the switches that are actuated by the cams. The several switches 241a, 241b and 242a to 246a are also shown diagrammatically in this Fig. 19.

Cam 241 has three lobes which are marked 1—4, 2—5 and 3—6 respectively. Each one of these lobes is intended to actuate each one of the switches 241a and 241b once during each complete revolution of the cam shaft 66. The switch 241a is illustrated as being connected by the wire 247 to the mounting post 248. Switch 241b is illustrated as being connected by the wire 249 to the mounting post 250. These mounting posts 248 and 250 are the supports for the two blades of a double pole, double throw switch. This switch is provided with a pair of fixed contacts 251 and a second pair of contacts 252. The contacts 251 and 252 are cross connected by wires 253 and 254. It will be noted that one of the contacts 251 is directly connected to the R solenoid by the wire 255 while the other contact 251 is directly connected to the S solenoid by the wire 256. It was previously pointed out that the solenoid R functioned to condition the four-way valve 223 to bring about movement of the hydraulic piston in cylinder 187 to produce an in-stroke of the milling cutter while solenoid S operated to condition the said four-way valve 223 to cause the piston in the hydraulic cylinder 187 to be moved for producing an out-stroke of the milling cutter.

The movable blades of the double pole double throw switch are out of contact with the terminals 251 and 252 when the machine is stopped. When it is desired to start the machine, these blades are moved into engagement with contacts or terminals 251. We then have switch 241a connected to solenoid S and switch 241b connected to solenoid R.

Every time one of the lobes of cam 241 actuates switch 241b, the circuit is closed to solenoid R and the milling cutter is caused to make an in-stroke. Every time a lobe of cam 241 actuates switch 241a, the circuit is closed to solenoid S and the milling cutter is caused to make an out-stroke.

The movable blades of the double pole, double throw switch may be moved into engagement with contacts 252 when the operator of the machine desires to temporarily change from an in-stroke to an out-stroke to back the milling cutter away from the wheel face.

Fig. 1 discloses a panel board 257 which has mounted thereon several switches that are used for controlling the operation of the machine. The double pole double throw switch that has just been described is illustrated on this panel board and identified by the reference character 258. This switch is illustrated as being provided with three pushbuttons numbered 259, 259a and 259b. Pushbutton 259 is pressed when the double pole, double throw switch is conditioned with its movable switch blades in engagement with contacts 251. Button 259a is pressed when the movable switch blades are in their off positions, or out of engagement with both pairs of contacts 251 and 252. Pushbutton 259b is pressed when it is desired to have the movable switch blades placed in engagement with contacts 252.

Cams numbered 242, 244 and 246 are superimposed at the lower end portion of the cam shaft 266. Cam 244 is illustrated as having two lobes. The four lobes of these three cams are identified by encircled numbers 1, 3, 5 and 6. The associated switches 242a, 244a and 246a are, also, identified with encircled numbers 5, 3—6, and 1 respectively. These encircled numbers for the lobes of the cams and for the switches identify the switches that are actuated by the lobes. These cams and their switches cooperate with the switches 201, 202 and 203 that were previously referred to as being actuated by fingers 195, 196 and 197 that are carried by the tool beam G and which limit the ends of cutting strokes 1, 3 and 5. Switch 246a, therefore, is connected by wire 260 to switch 201. Switch 244a is connected by wire 261 to switch 202. This switch 244a, also, is connected by wire 262 to switch 205 because this latter switch functions to stop the movement of the cutter beam G at the end of the sixth stroke. Switch 242a is connected by wire 263 to switch 203. We, therefore, have switches 201 and 246a operating in series for stopping the milling cutter at the end of the first stroke. We have switches number 202 and 244a operating in series to stop the milling cutter at the end of the third stroke. We have switch 205 and switch 244a operating in series to stop the milling cutter after it has completed the sixth stroke and is at the indexing position. We, also, have switches 203 and 242a operating in series to stop the milling cutter at the end of the fifth stroke.

The other contacts of switches 242a, 244a and 246a are connected by wires 264, 265 and 266 respectively to a common wire 267 which extends to a re-settable counter 268. This counter is intended to function to automatically stop the operation of the machine after it completes the formation of the desired number of teeth, for example 60 teeth, for a single disc. This re-settable counter is connected by wire 269 to the switch 105 which was previously described as being actuated by the pin 130 which is carried by the cam slide 91 of the indexing mechanism. In other words, each time the disc blank is indexed to a new space or groove location, switch 105 results in sending an impulse to the resettable counter device 268. The index mechanism operated switch 105 is further provided with a wire 270 which extends to and is connected with wire 271 that leads to the tool beam finger operated switch 205 which has been previously described as functioning to stop the milling cutter at the indexing position after having completed cut number 6. It will be seen, therefore, that the re-settable counter 268 is dependent upon the stopping of the milling cutter at the indexing position after having completed cut number 6 and upon indexing of the disc blank to a new space or groove location. The re-set counter device 268 is illustrated as having wire 272 extending therefrom. This wire is intended to carry a circuit that is controlled by the mechanism of the counter 268 to de-energize the circuits for solenoids R and S, the coolant motor 214 and the cutter head motor 166 after the operation of cutting 60 teeth on a disc blank has been completed. A pushbutton switch 273 is shown in Fig. 19 as being connected by wire 274 to the re-settable counter 268. This same switch 273 is illustrated in Fig. 1 as being mounted on panel board 257. This switch includes a pushbutton 275 which is pressed to bring about re-setting of the counter 268 at any time during the cutting of a disc blank. This permits removal of an unfinished disc blank and by re-setting 268 the machine will start its recount of the teeth at number one tooth on the succeeding disc blank. When the 60 teeth are completed and a disc blank is finished the re-set counter 268 will re-set itself automatically.

In describing the hydraulic system and its operation of the hydraulic cylinder 98 and its piston 231 of the indexing mechanism, solenoid 229 was referred to as being energized to move the valve body 227 of four-way valve 226 into its abnormal position against the force of the spring 228. This solenoid 229 has its circuit closed by means of the wire 276 which extends to a timer relay 277. This timer relay functions to energize the solenoid 229 for a period of approximately two seconds to bring about the operation of the indexing mechanism.

Cam 243 is illustrated in Fig. 19 as having six different lobes which are identified by the encircled numbers 1 to 6 inclusive. This cam functions to actuate switch 243a every time the cam shaft 66 has moved through 60° of a circle, or after rotation of this cam shaft has moved the master cam 61 into a new one of its six positions for operatively arranging its successive lobes with respect to the operating roller 62 of the oscillating table actuating arm 55. Every time one of the six lobes of cam 243 actuates the switch 243a, the switch closes a circuit through wire 278 which is connected to the relay 279. Energizing of this relay 279 results in breaking the circuit to the cam shaft driving motor 71 and de-energizing the electrically operated brake 73 which is then allowed to be spring set to stop further rotation. Wire 280 represents the circuit between the relay 279 and the cam shaft driving motor 71 and the brake 73.

Cam 245 is illustrated as being provided with two lobes which are identified by encircled numerals 2 and 4 and a third portion which is identified by the encircled number 6. The switch 245a of this cam 245 is illustrated as being connected by wire 281 with the tool beam finger operated switch 204. This switch 204 has been described as functioning to stop the milling cutter at the ends of strokes numbered 2 and 4. The lobes of cam 245 that are identified by the encircled numbers 2 and 4 actuate the switch 245a of this cam so that it will operate in series with switch 204 for stopping the feed of the milling cutter at the ends of these two strokes numbered 2 and 4. Strokes 2 and 4 are two of the three out-strokes of the milling cutter. The third out-stroke bears number 6 but the milling cutter should not stop at the end of the sixth cut but should travel to the indexing position. When the dwell portion of cam 245, which is identified by the encircled number 6, is traveling past the operating roller of switch 245a, the closing of switch 204, by its tool beam carried finger, will not result in stopping the out-feed of the milling tool at a position which corresponds with the ends of strokes numbered 2 and 4. The wire 281, which extends from switch 245a to switch 204 has connected therein a manual pushbutton switch 282. This switch is normally closed but is manually held in its open position if at any time it is desired to have the milling cutter overrun to the indexing position so that, for example, the disc blank W and its mandrel can be removed from the chuck 36.

Switch 245a is further illustrated as having wire 283 which extends to the relay 284. This relay functions to energize the cam shaft operating motor 71 and to energize and release the electrically operated brake 73.

It will be appreciated that the circuits for the various instrumentalities illustrated in Fig. 19 are only partially disclosed. It is considered, however, that the detailed explanation that is provided for each instrumentality and its control devices will enable one skilled in the art to arrive at a clear understanding of the functions performed by the instrumentalities.

The panel board 257 of Fig. 1 is further illustrated as being provided with a two-button switch 285 that is operable manually to start and stop the milling cutter driving motor 166. A two-button switch 286 is mounted on the panel board 257 and functions to make and break at this point the control circuit for the electric motor 71 which drives the cam shaft 66. It will be appreciated from the preceding description that the actual starting and stopping of the electric motor 71 is brought about by the cam controlled switches, etc., that have been described in connection with the disclosure of Fig. 19. However, these cam controlled switches will not bring about starting and stopping of the electric motor 71 unless the starting button of switch 286 is pressed in and it, therefore, stands to reason that when the off button of switch 286 is pressed in the motor 71 cannot rotate the cam shaft 66 to operate the switches controlled by the cams carried by this shaft.

Fig. 3 discloses a switch 287 as being mounted on the upright post C. The two pushbuttons of this switch will be used to start and stop electric motor 220 which drives the hydraulic gear pump 221. Switch 288 mounted on the upright post D has on and off pushbuttons which will be used to control electric motor 214 which drives the coolant pump 213. Interposed between the main supply wires, not shown, and the various electric control circuits, best illustrated in Fig. 19, is a main switch 289 which is suitably mounted on the upright post C. This main switch, of course, must be closed before the machine can be operated and the opening of this main switch will cut off the power to the entire machine.

It is believed that a brief review of the mode of operation of the machine will be desirable at this point.

The machine is constructed so that the milling cutter may be moved through a maximum feed stroke capable of handling all disc blank sizes now being used for producing toothed discs as well as the larger sizes which are contemplated for the future.

For each different sized disc blank, there may be required:

1. A master cam 61,
2. A face contour cam 173,
3. A set of tool beam stroke limiting fingers 195 to 199 inclusive,
4. A work holding mandrel,
5. A disc blank adapter plate 52,
6. A gage block 79 for locating the compensating chuck carriage 30, and
7. A milling cutter 164.

Before starting up the machine, the disc blank and its mandrel should be properly positioned with respect to the supporting chuck. Of course, the seven elements listed above should all be arranged in the machine and they should be the proper ones to correspond with the size of the disc blank that is placed in the machine. However some of these elements may be used for more than one size of disc. The master cam 61 should be turned by the hand wheel 74 so that the roller 62, carried by the oscillating table arm 55 is in engagement with the number 1 lobe of the cam. This positioning of the master cam 61, also, will properly position the cams 241 to 246 which are carried by the cam shaft 66 for making the first cut of the first groove to be produced in the disc blank.

The main switch 289 should be conditioned to energize all of the control circuits as well as the circuits for the cutter motor 166, the coolant pump driving motor 214, and the hydraulic gear pump motor 220 so that these motor circuits are all energized. The double pole double throw switch that is controlled by the buttons 259, 260 and 261 should be conditioned by pressing the button 260, or so that the movable switch blades are out of engagement with both sets of contacts 251 and 252. The switch 286, also, should be actuated to initially energize the circuit to the cam shaft driving motor 71.

The cutting operation is actually started by pushing in button 259 of the double pole, double throw feed control switch 258. This operation of the switch results in energizing the solenoid R and this solenoid functions to start the feed of fluid to the outer end of the hydraulic cylinder 187.

The six different cuts are then produced and they are controlled by the several fingers 195 to 199, of the tool beam G, properly engaging and actuating the switches 201 to 205 inclusive. The cams carried by shaft 66 and the switches operated by these cams also perform their part in controlling the production of the six cuts that are required to produce the first groove. As these six strokes or cuts have been completely described above, no further reference will be made to the same. After the sixth cut is completed, the milling cutter over-travels to the indexing position and the circuit to solenoid 229 is closed so that the four-way valve 226 will be actuated to feed the high pressure fluid to the hydraulic cylinder 98 of the indexing mechanism through the tube 102. The indexing mechanism operates to shift the disc blank to the next space or groove location. After this indexing of the disc blank, the cutting cycle is automatically repeated to produce a groove at the new location.

The groove producing cutting cycle is repeated and the disc blank is indexed to a new location until the required 60 teeth have been formed on the conical face of the blank. After the 60 teeth have been produced, the automatic electric counter device 268 will function to break the circuits to the hydraulic motor 220, the coolant motor 214, and the cutter motor 166.

The finished disc may then be removed from the machine and a new disc blank substituted therefor. This new disc blank can be provided with the desired number of teeth on its conical face by repeating the aforementioned operating cycle of the machine.

Although the operation of the machine has been described as requiring six strokes to produce each tooth space or groove, it is possible to operate the machine so that only four strokes of the milling cutter need be employed to obtain the same results. This four stroke cycle can be obtained by employing a master cam 61 on which lobes 3 and 4 have been omitted. When a four stroke cutting cycle is employed, the limiting finger 196 is made long enough to operate switch 202 just after the milling tool starts stroke number 3. Actuation of this switch 202 at this point will reverse the direction of feed of the milling cutter. All of the remaining cams, etc., may be left in a condition to operate on a six stroke cycle but the reduction of the lengths of strokes 3 and 4 to only about one-quarter of an inch in length will prevent the milling cutter from touching the disc face and these two strokes will merely be omitted, or passed over.

In the above description, the disc blanks, or the finished, toothed discs are referred to as being conical. It is explained, however, that the radial contour of the conical disc faces may be either straight or flat, or curved and the curvature may be either convex or concave. Therefore, wherever the term "conical" is employed in either the specification or the claims, it is to be understood that this term is to be given its generic meaning and it is to be construed as covering either flat or curved contours.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, we claim:

1. A machine for producing toothed discs, comprising means for supporting a disc blank for independent angular movements about two different axes with movement about one axis effecting indexing of successive areas of a blank into an operative position with respect to a cutting zone and with movement about the other axis causing different parts of each blank area to occupy said cutting zone, means for intermittently moving the disc blank supporting means in the same direction and through the same angular distance about said one axis for indexing, means for moving the disc blank supporting means about said other axis several times in opposite directions and through different angular distances during each interval between said indexing movements for positioning the different parts of each blank area, said last mentioned means for moving the disc blank supporting means comprising a member to be actuated operatively connected to said supporting means, a shaft intermittently rotated in the same direction several times after each indexing movement, and cam means driven by said shaft for actuating said member, a power driven milling cutter, means for supporting the cutter for reciprocatory movements through said cutting zone, and means for reciprocating the cutter supporting means to cause the milling cutter to remove a cut from each part of each blank area as it occupies the cutting zone.

2. A machine for producing toothed discs, comprising a disc blank holder, means for supporting and moving the holder about an axis to effect indexing of successive areas of a blank into an operative position with respect to a cutting zone, means for supporting and oscillating the holder about a different axis that is arranged at an acute angle with respect to the first mentioned axis to cause different parts of each blank area to occupy said cutting zone, means for adjusting the blank holder and its supporting and moving means as a unit and in a direction that is normal to said different axis to accommodate different sized disc blanks, a power driven milling cutter, means for supporting the cutter for reciprocatory movements through said cutting zone, and means for reciprocating the cutter supporting means to cause the milling cutter to remove a cut from each part of each blank area as it occupies the cutting zone.

3. A machine for producing toothed discs, comprising means for supporting a disc blank for independent angular movements about two axes arranged at an acute angle with respect to each other with movement about one axis effecting indexing of successive areas of a blank into an operative position with respect to a cutting zone and with movement about the other axis causing different parts of each blank area to occupy said cutting zone, means for intermittently moving the disc blank supporting means in the same direction and through the same angular distance about said one axis for indexing, means for moving the disc blank supporting means about said other axis several times in opposite directions and through different angular distances during each interval between said indexing movements for positioning the different parts of each blank area, means for adjusting the disc blank supporting means in a direction that is normal to said other axis to accommodate different sized disc blanks, a power driven milling cutter, means for supporting the cutter for reciprocatory movements through said cutting zone, and means for reciprocating the cutter supporting means to cause the milling cutter to remove a cut from each part of each blank area as it occupies the cutting zone.

4. A machine for producing toothed discs, comprising a disc blank holder, means for supporting and moving the holder about the true axis of the blank holder to effect indexing of successive areas of a blank into an operative position with respect to a cutting zone, means for supporting and oscillating the first mentioned means with the disc holder about an axis that passes through the cutting zone to cause different parts of each blank area to occupy said cutting zone, a power driven milling cutter, means for supporting the cutter for reciprocatory movements through a plane that is common to both of the aforesaid axes at all times to establish said cutting zone, and means for reciprocating the cutter supporting means to cause the milling cutter to remove a cut from each part of each blank area as it occupies the cutting zone.

5. A machine for producing toothed discs, comprising a disc blank holder, means for supporting and intermittently moving the holder in the same direction about an axis to effect indexing of successive areas of a blank into an operative position with respect to a cutting zone, means for supporting and for oscillating after each indexing movement the first mentioned means with the disc holder about an axis which is arranged at an acute angle with respect to the indexing axis to cause different parts of each blank area to occupy said cutting zone, an intermittently rotated cam shaft common to both of the aforesaid means for timing the sequence of the intermittent movements of the blank holder and the oscillations of the supporting means for the blank holder, a power driven milling cutter, means for supporting the cutter for reciprocatory movements through said cutting zone, and means for reciprocating the cutter supporting means to cause the milling cutter to remove a cut from each part of each blank area as it occupies the cutting zone.

6. A machine for producing toothed discs, comprising a disc blank holder, means for supporting and intermittently moving the holder in the same direction about the true axis of the blank to effect indexing of successive areas of a blank into an operative position with respect to a cutting zone, means for supporting and for oscillating after each indexing movement the holder about a different axis which is arranged at an acute angle with respect to the true axis of the blank and which passes through the cutting zone to cause different parts of each blank area to occupy said cutting zone, a power driven milling cutter, means for supporting the cutter for reciprocatory movements through a plane that is common to both of the aforesaid axes at all times to establish said cutting zone, and means for reciprocating the cutter supporting means to cause the milling cutter to remove a cut from each part of each blank area as it occupies the cutting zone.

7. A machine for producing toothed discs, comprising a disc blank holding mandrel, a chuck removably mounting the mandrel, means for supporting the chuck for angular movements about the axis of the mandrel to permit indexing of successive areas of a blank into an operative position with respect to a cutting zone, means for supporting the chuck supporting means for oscillatory movements about an axis that is arranged at an acute angle with respect to the axis of the mandrel so that it intersects the particular area of the blank that is in said operative position to permit different parts of each blank area to occupy said cutting zone, a power driven milling cutter, means for supporting the cutter for reciprocatory movements through a plane that is common to both of the aforesaid axes at all times to establish said cutting zone, and means for reciprocating the cutter supporting means to cause the milling cutter to remove a cut from each part of each blank area as it occupies the cutting zone.

8. A machine for producing toothed discs, comprising a disc blank holding mandrel, a chuck removably mounting the mandrel, means for supporting the chuck for angular movements about the axis of the mandrel to permit indexing of successive areas of a blank into an operative position with respect to a cutting zone, means for supporting the chuck supporting means for oscillatory movements about an axis that is arranged at an acute angle with respect to the axis of the mandrel so that it intersects the particular area of the blank that is in said operative position to permit different parts of each blank area to occupy said cutting zone, means for adjusting the two aforesaid supporting means relative to each other in a direction that is normal to the oscillatory axis so as to displace the oscillatory axis relative to the indexing axis to accommodate different sized disc blanks, a power driven milling cutter, means for supporting the cutter for reciprocatory movements through said cutting zone, and means for reciprocating the cutter supporting means to cause the milling cutter to remove a cut from each part of each blank area as it occupies the cutting zone.

9. A machine for producing toothed discs, comprising a disc blank holder, means for supporting the holder for movements about an axis to effect indexing of successive areas of a blank into an operative position with respect to a cutting zone, means for supporting the holder and the first mentioned means for oscillatory movements about an axis that intersects the first mentioned axis at an acute angle to cause different parts of each blank area to occupy said cutting zone, means for effecting adjustments of the holder and the first mentioned means relative to the second mentioned means to change the relative positions but not the angle of the indexing and oscillating axes, a power driven milling cutter, means for supporting the cutter for reciprocatory movements through a plane that is common to both of said axes at all times to establish said cutting zone, and means for reciprocating the cutter supporting means to cause the milling cutter to remove a cut from each part of each blank area as it occupies the cutting zone.

10. A machine for producing toothed discs, comprising a disc blank holding mandrel, a chuck removably mounting the mandrel and supporting it with its axis inclined to the horizontal, a carriage supporting the chuck for angular movements about the inclined axis of the mandrel to permit indexing of successive areas of a blank into an operative position with respect to a cutting zone, a table structure on which the carriage is horizontally slidably supported, said table structure including a stationary lower part and an upper part mounted on the lower part, to which the carriage is slidably connected, for oscillatory movements about a vertical axis that intersects the particular area of the blank that is in said operative position to permit different parts of each blank area to occupy said cutting zone, a power driven milling cutter, means for supporting the cutter for reciprocatory movements through said cutting zone, and means for reciprocating the cutter supporting means to cause the milling cutter to remove a cut from each part of each blank area as it occupies the cutting zone.

11. A machine for producing toothed discs, comprising a disc blank holding mandrel, a chuck removably mounting the mandrel and supporting it with its axis inclined to the horizontal, a carriage supporting the chuck for angular movements about the inclined axis of the mandrel to permit indexing of successive areas of a blank into an operative position with respect to a cutting zone, a table structure on which the carriage is horizontally slidably supported, said table structure including a stationary lower part and an upper part, to which the carriage is slidably connected, mounted on the lower part for oscillatory movements about a vertical axis that intersects the particular area of the blank that is in said operative position to permit different parts of each blank area to occupy said cutting zone, means for effecting slidable adjustments of the carriage relative to its supporting table structure to regulate the point at which the fixed axis of oscillation intersects the disc blank, a power driven milling cutter, means for supporting the cutter for reciprocatory movements through said cutting zone, and means for reciprocating the cutter supporting means to cause the milling cutter to remove a cut from each part of each blank area as it occupies the cutting zone.

12. A machine for producing toothed discs, comprising a disc blank holding mandrel, a chuck removably mounting the mandrel, means for supporting the chuck for angular movements about the axis of the mandrel to permit indexing of successive areas of a blank into an operative position with respect to a cutting zone, a power operated mechanism carried by the chuck and its supporting means for effecting step-by-step indexing movements of the chuck, means for supporting the chuck supporting means for oscillatory movements about an axis that intersects the particular area of the blank that is in said operative position to permit different parts of each blank area to occupy said cutting zone, means including a rotatable cam having a plurality of equi-angularly spaced lobes for effecting duplicate oscillatory movements of the chuck supporting means after each indexing movement of the chuck and a drive mechanism for intermittently rotating the cam with each rotary motion thereof being equal in angular distance to the spacing of adjacent cam lobes, a power driven milling cutter, means for supporting the cutter for reciprocatory movements through said cutting zone, and means for reciprocating the cutter supporting means to cause the milling cutter to remove a cut from each part of each blank area as it occupies the cutting zone.

13. A machine for producing toothed discs, comprising a disc blank holding mandrel, a chuck removably mounting the mandrel and supporting it with its axis inclined to the horizontal, means for supporting the chuck for angular movements about the axis inclined of the mandrel to permit indexing of successive areas of a blank into an operative position with respect to a cutting zone, a power operated mechanism carried by the chuck and its supporting means for effecting step-by-step indexing movements of the chuck, means for supporting the chuck supporting means for oscillatory movements about a vertical axis that intersects the particular area of the blank that is in said operative position to permit different parts of each blank area to occupy said cutting zone, means including a rotatable cam having a plurality of equi-angularly spaced lobes for effecting duplicate oscillatory movements of the chuck supporting means after each indexing movement of the chuck and a drive mechanism for intermittently rotating the cam with each rotary motion thereof being equal in angular distance to the spacing of adjacent cam lobes, means for adjusting the two aforesaid supporting means relative to each other to change the relative positions of the inclined indexing and the vertical oscillatory axes, a power driven milling cutter, means for supporting the cutter for reciprocatory movements through said cutting zone, and means for reciprocating the cutter supporting means to cause the milling cutter to remove a cut from each part of each blank area as it occupies the cutting zone.

14. A machine for producing toothed discs, comprising means for supporting a disc blank for independent angular movements about two different axes with movement about one axis effecting indexing of successive areas of a blank into an operative position with respect to a cutting zone and with movement about the other axis causing different parts of each blank area to occupy said cutting zone, a cutter head including a power driven milling cutter, means for supporting the cutter head for reciprocatory movements that will cause the cutter to travel through the cutting zone, means for reciprocating the cutter head to cause the cutter to remove a cut from each part of each blank area as it occupies the cutting zone, means for mounting the cutter head on its supporting means for reciprocatory movements at right angles to the reciprocatory movements permitted by the said supporting means to raise and lower the position of the cutter relative to the blank, and means for reciprocating the cutter head relative to its supporting means as the cutter is removing each cut from the blank.

15. A machine for producing toothed discs, comprising a machine frame, means for supporting a disc blank for independent angular movements about two different axes with movement about one axis effecting indexing of successive areas of a blank into an operative position with respect to a cutting zone and with movement about the other axis causing different parts of each blank area to occupy said cutting zone, a cutter head including a power driven milling cutter, a beam mounted in guides on the machine frame for supporting the cutter head for reciprocatory movements that will cause the cutter head to travel through the cutting zone, a fluid motor for reciprocating the beam to cause the cutter to remove a cut from each part of each blank area as it occupies the cutting zone, a fluid circuit for the fluid motor, and control means for the fluid circuit operatively associated with the relatively movable guides of the machine frame and the beam for effecting variations in the direction and extent of movements of the beam.

16. A machine for producing toothed discs, comprising means for supporting a disc blank for independent angular movements about two different axes with movement about one axis effecting indexing of successive areas of a blank into an operative position with respect to a cutting zone and with movement about the other axis causing different parts of each blank area to occupy said cutting zone, a cutter head including a power driven milling cutter, a beam mounted in guides for supporting the cutter head for reciprocatory movements that will cause the cutter to travel through the cutting zone, means for reciprocating the beam to cause the cutter to remove a cut from each part of each blank area as it occupies the cutting zone, means for mounting the cutter head on the beam for reciprocatory movements at right angles to the direction of movement of the beam to raise and lower the position of the cutter relative to the blank, and means for reciprocating the cutter relative to the beam as the cutter is removing each cut from the blank.

17. A machine for producing toothed discs, comprising means for supporting a disc blank for independent angular movements about two different axes with movement about one axis effecting indexing of successive areas of a blank into an operative position with respect to a cutting zone and with movement about the other axis causing different parts of each blank area to occupy said cutting zone, a cutter head including a power driven milling cutter, means for supporting the cutter head for reciprocatory movements that will cause the cutter to travel through the cutting zone, a hydraulic cylinder and piston assembly for reciprocating the cutter head to cause the cutter to remove a cut from each part of each blank area as it occupies the cutting zone, and means for controlling the operation of the hydraulic assembly to effect variations in the lengths of the strokes of its piston to cause the cutter head to be moved different distances.

18. A machine for producing toothed discs, comprising means for supporting a disc blank for independent angular movements about two different axes with movement about one axis effecting indexing of successive areas of a blank into an operative position with respect to a cutting zone and with movement about the other axis causing different parts of each blank area to occupy said cutting zone, a cutter head including a power driven milling cutter, means for supporting the cutter head for reciprocatory movements that will cause the cutter to travel through the cutting zone, means for reciprocating the cutter head to cause the cutter to remove a cut from each part of each blank area as it occupies the cutting zone, means for mounting the cutter head on its supporting means for reciprocatory movements at right angles to the reciprocatory movements permitted by the supporting means to raise and lower the position of the cutter relative to the blank, and a cam and roller assembly for reciprocating the cutter head relative to its supporting means as the cutter is removing each cut from the blank.

19. A machine for producing toothed discs, comprising means for supporting a disc blank for independent angular movements about two different axes with movement about one axis effecting indexing of successive areas of a blank into an operative position with respect to a cutting zone and with movement about the other axis causing different parts of each blank area to occupy said cutting zone, a cutter head including a power driven milling cutter, means for supporting the cutter head for reciprocatory movements that will cause the cutter to travel through the cutting zone, a hydraulic cylinder and piston assembly for reciprocating the cutter head to cause the cutter to remove a cut from each part of each blank area as it occupies the cutting zone, means for mounting the cutter head on its supporting means for reciprocatory movements at right angles to the reciprocatory movements permitted by the supporting means to raise and lower the position of the cutter relative to the blank, and a cam and roller assembly for reciprocating the cutter head relative to its supporting means as the cutter is removing each cut from the blank.

20. A machine for producing toothed discs, comprising means for supporting a disc blank for independent angular movements about two different axes which are arranged at an acute angle with respect to each other with movement about one axis effecting indexing of successive areas of a blank into an operative position with respect to a cutting zone and with movement about the other axis causing different parts of each blank area to occupy said cutting zone, a cutter head including a power driven milling cutter, a beam mounted in guides for supporting the cutter head for reciprocatory movements that will cause the cutter to travel through the cutting zone, a hydraulic cylinder and piston assembly for reciprocating the beam to cause the cutter to remove a cut from each part of each blank area as it occupies the cutting zone, and means for controlling the operation of the hydraulic assembly to effect variations in the lengths of the strokes of its piston to cause the cutter head to be moved different distances.

21. A machine for producing toothed discs, comprising means for supporting a disc blank for independent angular movements about two different axes, both of which pass through the space defined by the perimeter of the disc blank, with movement about one axis effecting indexing of successive areas of a blank into an operative position with respect to a cutting zone and with movement about the other axis causing different parts of each blank area to occupy said cutting zone, a cutter head including a power driven milling cutter, a beam mounted in guides for supporting the cutter head for reciprocatory movements that will cause the cutter to travel through the cutting zone, a hydraulic cylinder and piston assembly for reciprocating the beam to cause the cutter to remove a cut from each part of each blank area as it occupies the cutting zone, means for mounting the cutter head on the beam for reciprocatory movements at right angles to the direction of movement of the beam to raise and lower the position of the cutter relative to the blank, and a cam and roller assembly for reciprocating the cutter head relative to the beam as the cutter is removing each cut from the blank.

22. A machine for producing toothed discs, comprising means for supporting a disc blank for independent angular movements about two angularly arranged axes with movement about one axis effecting indexing of successive areas of a blank into an operative position with respect to a cutting zone and with movement about the other axis causing different parts of each blank area to occupy said cutting zone, a cutter head including a power driven milling cutter, a beam mounted in guides for supporting the cutter head for reciprocatory movements that will cause the cutter to travel through the cutting zone, a hydraulic cylinder and piston assembly for reciprocating the beam to cause the cutter to remove a cut from each part of each blank area as it occupies the cutting zone, means for mounting the cutter head on the beam for reciprocatory movements at right angles to the direction of movement of the beam to raise and lower the position of the cutter relative to the blank, and a cam and roller assembly for reciprocating the cutter head relative to the beam as the cutter is removing each cut from the blank.

23. A machine for producing toothed discs, comprising a disc blank holder, means for supporting and moving the holder about an axis to effect indexing of successive areas of a blank into an operative position with respect to a cutting zone, means for supporting and oscillating the holder about a different axis to cause different parts of each blank area to occupy said cutting zone, a cutter head including a power driven milling cutter, means for supporting the cutter head for reciprocatory movements that will cause the cutter to travel through the cutting zone, means for reciprocating the cutter head supporting means to cause the cutter to remove a cut from each part of each blank area as it occupies the cutting zone, means for mounting the cutter head on its supporting means for reciprocatory movements at right angles to the reciprocatory movements permitted by the supporting means to raise and lower the position of the cutter relative to the blank, and means for reciprocating the cutter head relative to its supporting means while the supporting means is reciprocating and as the cutter is removing each cut from the blank.

24. A machine for producing toothed discs, comprising a disc blank holding mandrel, a chuck removably mounting the mandrel, means for supporting the chuck for angular movements about the axis of the mandrel to permit indexing of successive areas of a blank into an operative position with respect to a cutting zone, means for supporting the chuck supporting means for oscillatory movements about an axis that intersects the particular area of the blank that is in said operative position to permit different parts of each blank area to occupy said cutting zone, a cutter head including a power driven milling cutter, means for supporting the cutter head for reciprocatory movements that will cause the cutter to travel through the cutting zone, means for reciprocating the cutter head supporting means to cause the cutter to remove a cut from each part of each blank area as it occupies the cutting zone, means for mounting the cutter head on its supporting means for reciprocatory movements at right angles to the reciprocatory movements permitted by the supporting means to raise and lower the position of the cutter relative to the blank, and means for reciprocating the cutter head relative to its supporting means while the supporting means is reciprocating and as the cutter is removing each cut from the blank.

25. In a machine for producing toothed discs, the improvement which comprises a disc blank holding mandrel, a chuck removably mounting the mandrel with its axis inclined to the horizontal, means for supporting the chuck for angular movements about the inclined axis of the mandrel to permit indexing of successive areas of a blank into an operative position with respect to a cutting zone, and means for supporting the chuck supporting means for oscillatory movements about a vertical axis that intersects the inclined indexing axis at an acute angle and also intersects the particular area of the blank that is in said operative position to permit different parts of the blank area to occupy said cutting zone.

26. A machine for producing toothed discs, comprising a cutter head including a power driven milling cutter, a beam mounted in guides for supporting the cutter head for reciprocatory movements that will cause the cutter to travel through a cutting zone, means for reciprocating the beam, means for mounting the cutter head on the beam for reciprocatory movements at right angles to the direction of movement of the beam to raise and lower the position of the cutter while traveling through the cutting zone, means operating in response to reciprocations of the beam for reciprocating the cutter head relative to the beam as the cutter is traveling through the cutting zone, and means for supporting a disc blank for indexing movements about the axis of the blank to cause successive areas of the blank to be arranged in an operative position with respect to the cutting zone and for oscillatory movements about an axis that is arranged at an acute angle with respect to the indexing axis to permit different parts of each operatively positioned blank area to occupy said cutting zone.

HENRY G. KELLER.
CHARLES M. YOUNG, Jr.

REFERENCES CITED

The following references are of record in the file of this patent:

UNITED STATES PATENTS

| Number | Name | Date |
|---|---|---|
| 2,250,241 | Thalmann | July 22, 1941 |
| 2,315,068 | Matthews | Mar. 30, 1943 |
| 2,356,571 | Dewoitine | Aug. 22, 1944 |
| 319,429 | Smith et al. | June 2, 1885 |
| 1,775,184 | Abbott | Sept. 9, 1930 |
| 2,161,269 | Zimmermann | June 6, 1939 |
| 1,341,252 | Bausman et al. | May 25, 1920 |
| 1,957,028 | Maurer | May 1, 1934 |
| 1,959,435 | Marsilius | May 22, 1934 |
| 2,161,268 | Zimmermann | June 6, 1939 |
| 2,271,848 | Tcimpidis | Feb. 3, 1942 |
| 2,329,756 | Granberg et al. | Sept. 21, 1943 |